United States Patent
Steenstrup et al.

(10) Patent No.: US 11,428,810 B2
(45) Date of Patent: *Aug. 30, 2022

(54) MULTI-PERSPECTIVE ENSONIFICATION SYSTEM AND METHOD

(71) Applicant: R2SONIC, LLC, Austin, TX (US)

(72) Inventors: Jens Steenstrup, Austin, TX (US); Christopher Tiemann, Austin, TX (US); Peter Bilodeau, Austin, TX (US); Mark Chun, Austin, TX (US); Kirk Hobart, Austin, TX (US)

(73) Assignee: R2SONIC, LLC, Austin, TX (US)

( * ) Notice: Subject to any disclaimer, the term of this patent is extended or adjusted under 35 U.S.C. 154(b) by 404 days.

This patent is subject to a terminal disclaimer.

(21) Appl. No.: 16/516,084

(22) Filed: Jul. 18, 2019

(65) Prior Publication Data

US 2020/0363526 A1    Nov. 19, 2020

Related U.S. Application Data

(63) Continuation of application No. 16/016,632, filed on Jun. 24, 2018, now Pat. No. 10,429,505.

(60) Provisional application No. 62/528,354, filed on Jul. 3, 2017.

(51) Int. Cl.
*G01S 15/00* (2020.01)
*G01S 15/89* (2006.01)
*G01S 7/53* (2006.01)
*G01S 7/54* (2006.01)

(52) U.S. Cl.
CPC ............... *G01S 15/89* (2013.01); *G01S 7/53* (2013.01); *G01S 7/54* (2013.01)

(58) Field of Classification Search
None
See application file for complete search history.

(56) References Cited

U.S. PATENT DOCUMENTS

| | | | |
|---|---|---|---|
| 3,144,631 A * | 8/1964 | Lustig | G01S 15/8902 367/12 |
| 5,200,931 A | 4/1993 | Kosalos et al. | |
| 5,243,988 A * | 9/1993 | Sieben | A61B 8/12 128/925 |

(Continued)

FOREIGN PATENT DOCUMENTS

| | | | |
|---|---|---|---|
| CN | 105258684 A * | 1/2016 | |
| CN | 106886024 A * | 6/2017 | G01S 11/14 |

(Continued)

OTHER PUBLICATIONS

Jung, Donghwan, Jeasoo Kim, and Gihoon Byun. "Numerical modeling and simulation technique in time-domain for multibeam echo sounder." International Journal of Naval Architecture and Ocean Engineering 10.2 (2017): 225-234. (Year: 2017).*

(Continued)

*Primary Examiner* — Isam A Alsomiri
*Assistant Examiner* — Jonathan D Armstrong
(74) *Attorney, Agent, or Firm* — Paul D. Chancellor; Ocean Law

(57) ABSTRACT

A survey system and method to improve one or more of survey quality, efficiency, and utility for example by utilizing a vessel mounted MBES and a selected survey plan to check sound speed(s) via eliciting echoes from reflectors in colocated groups of reflectors using multi-perspective ensonification.

22 Claims, 19 Drawing Sheets

(56) References Cited

U.S. PATENT DOCUMENTS

| | | | |
|---|---|---|---|
| 5,287,330 | A | 2/1994 | Gilmour |
| 5,318,028 | A | 6/1994 | Mitchell |
| 5,323,362 | A | 6/1994 | Mitchell |
| 5,433,202 | A | 7/1995 | Mitchell |
| 5,483,499 | A | 1/1996 | Brumley et al. |
| 5,596,549 | A | 1/1997 | Sheriff |
| 5,608,689 | A * | 3/1997 | Capell, Sr. .......... G01S 7/52004 367/87 |
| 6,195,808 | B1 | 2/2001 | Berliner |
| 6,204,778 | B1 | 3/2001 | Bergan |
| 6,285,628 | B1 * | 9/2001 | Kiesel .................. G10K 11/343 367/138 |
| 6,438,071 | B1 | 8/2002 | Hansen et al. |
| 6,987,707 | B2 | 1/2006 | Feintuch |
| 7,092,440 | B1 * | 8/2006 | Dress, Jr. ................ H04B 1/692 332/103 |
| 7,215,598 | B2 | 5/2007 | Guthmann |
| 7,355,924 | B2 | 4/2008 | Zimmerman |
| 7,547,283 | B2 | 6/2009 | Mourad |
| 7,972,271 | B2 | 7/2011 | Johnson |
| 8,220,408 | B2 | 7/2012 | Stone |
| 8,248,298 | B2 | 8/2012 | Lalezari |
| 8,300,502 | B2 | 10/2012 | Yockney |
| 8,305,841 | B2 * | 11/2012 | Riordan .................. G01S 15/87 367/88 |
| 8,385,152 | B2 | 2/2013 | Brumley |
| 8,974,390 | B1 * | 3/2015 | Sankar ................ G01S 7/52046 600/407 |
| 9,244,168 | B2 * | 1/2016 | Proctor .................... G01S 15/89 |
| 9,664,783 | B2 | 5/2017 | Brown |
| 9,739,881 | B1 | 8/2017 | Pavek |
| 9,784,825 | B2 | 10/2017 | Brown |
| 9,817,116 | B1 | 11/2017 | Steenstrup et al. |
| 9,817,117 | B1 | 11/2017 | Steenstrup et al. |
| 9,869,752 | B1 | 1/2018 | Premus |
| 10,067,228 | B1 | 9/2018 | Steenstrup et al. |
| 10,132,924 | B2 | 11/2018 | Steenstrup et al. |
| 10,605,914 | B2 * | 3/2020 | Steenstrup .......... G01S 7/52003 |
| 2003/0235112 | A1 * | 12/2003 | Zimmerman ........... G01S 15/89 367/4 |
| 2004/0037166 | A1 * | 2/2004 | Handa .................. G10K 11/341 367/103 |
| 2006/0171255 | A1 * | 8/2006 | Zhu .......................... G01S 15/60 367/89 |
| 2007/0025183 | A1 | 2/2007 | Zimmerman et al. |
| 2008/0137483 | A1 | 6/2008 | Sawrie |
| 2010/0302907 | A1 * | 12/2010 | Brumley .................. G01V 1/38 367/89 |
| 2010/0331689 | A1 * | 12/2010 | Wegener .................. A61B 8/06 600/443 |
| 2011/0202278 | A1 * | 8/2011 | Caute ...................... G01S 7/003 702/14 |
| 2012/0327741 | A1 | 12/2012 | Pearce |
| 2015/0346321 | A1 * | 12/2015 | Jansen ...................... G01S 7/02 342/107 |
| 2016/0011326 | A1 | 1/2016 | Caute et al. |
| 2016/0278714 | A1 * | 9/2016 | Sankar .................. G01S 7/4004 |
| 2017/0315237 | A1 * | 11/2017 | Steenstrup .......... G01S 15/8902 |

FOREIGN PATENT DOCUMENTS

| | | | | |
|---|---|---|---|---|
| CN | 109000778 A | * | 12/2018 | ............... G01H 5/00 |
| CN | 110146895 A | * | 8/2019 | ............... G01H 5/00 |
| EP | 2299292 A1 | * | 3/2011 | ......... G01F 23/2962 |
| GB | 2412967 A | * | 10/2005 | ............ G01S 15/42 |
| JP | H0775637 A | * | 3/1995 | |
| KR | 20150068237 A | * | 6/2015 | |
| RU | 2608301 C2 | * | 1/2017 | |
| WO | WO-0000793 A1 | * | 1/2000 | ............... G01H 5/00 |
| WO | WO-03065073 A1 | | 8/2003 | |
| WO | WO-2016142885 A1 | * | 9/2016 | ............ G01C 13/00 |

OTHER PUBLICATIONS

Degauque, Pierre et al. "Propagation Modelling and Channel Characterization", Mobile Broadband Multimedia Networks, 2006, 119-217. (year: 2006).

Clarke, Thomas L. "Transverse Doppler Current Profilers", Ocean Acoustics Division/AOML/NOAA, Miama, FL, 194-198.

Wen Xu et al.: "Sparse-increment iteration-based sound velocity profile estimation with multi-beam bathymetry systems", Oceans, 2012, I EEE, Oct. 14, 2012, pp. 1-5, XP032299974, DOI: 10.1109/OCEANS.2012.6405006 ISBN: 978-1-4673-0829-8.

Fanlin Yang et al: "A Post-Processing Method for the Removal of Refraction Artifacts in Multibeam Bathymetry Data", Marine Geodesy., vol. 30, No. 3, Aug. 28, 2087, pp. 235-247, XP055653711, US ISSN: 0149-0419, DOI: 10.1080/01490410701438380.

Maleika Wojciech Ed—Xiaogang Ma: "The influence of track configuration and multibeam echosounder parameters on the accuracy of seabed DTMs obtained in shallow water", Earth Science Informatics, Springer Berlin Heidelberg, Berlin/Heidelberg, vol. 6, No. 2, Mar. 17, 2013, pp. 47-69, XP035349456, ISSN: 1865-0473, DOI:10.1007/S12145-013-0111-9.

* cited by examiner

FIG. 3B

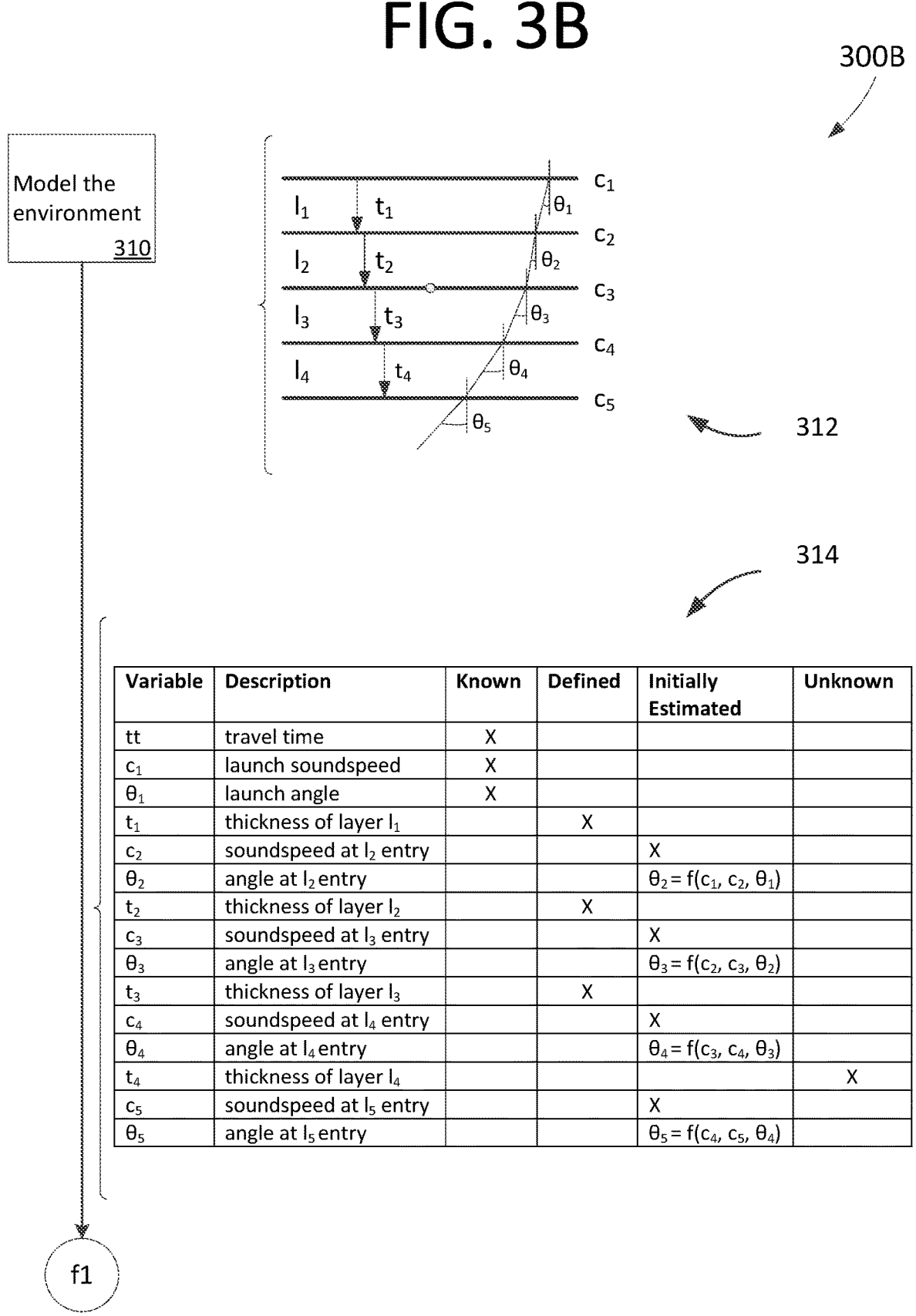

| Variable | Description | Known | Defined | Initially Estimated | Unknown |
|---|---|---|---|---|---|
| tt | travel time | X | | | |
| $c_1$ | launch soundspeed | X | | | |
| $\theta_1$ | launch angle | X | | | |
| $t_1$ | thickness of layer $l_1$ | | X | | |
| $c_2$ | soundspeed at $l_2$ entry | | | X | |
| $\theta_2$ | angle at $l_2$ entry | | | $\theta_2 = f(c_1, c_2, \theta_1)$ | |
| $t_2$ | thickness of layer $l_2$ | | X | | |
| $c_3$ | soundspeed at $l_3$ entry | | | X | |
| $\theta_3$ | angle at $l_3$ entry | | | $\theta_3 = f(c_2, c_3, \theta_2)$ | |
| $t_3$ | thickness of layer $l_3$ | | X | | |
| $c_4$ | soundspeed at $l_4$ entry | | | X | |
| $\theta_4$ | angle at $l_4$ entry | | | $\theta_4 = f(c_3, c_4, \theta_3)$ | |
| $t_4$ | thickness of layer $l_4$ | | | | X |
| $c_5$ | soundspeed at $l_5$ entry | | | X | |
| $\theta_5$ | angle at $l_5$ entry | | | $\theta_5 = f(c_4, c_5, \theta_4)$ | |

MULTI-PERSPECTIVE ENSONIFICATION SYSTEM AND METHOD

PRIORITY CLAIM, BENEFIT CLAIM AND INCORPORATION BY REFERENCE

This application is a continuation of U.S. patent application Ser. No. 16/016,632 filed Jun. 24, 2018 and claims the benefit of U.S. Provisional Pat. App. No. 62/528,354 filed Jul. 3, 2017. This application incorporates by reference, in their entireties and for all purposes, the disclosures of U.S. Pat. No. 3,144,631 concerning Mills Cross sonar, U.S. Pat. No. 8,305,841 concerning sonar used for mapping seafloor topography, U.S. Pat. No. 7,092,440 concerning spread spectrum communications techniques, U.S. Pat. No. 5,483,499 concerning Doppler frequency estimation, and U.S. Pat. No. 9,244,168 concerning frequency burst sonar.

BACKGROUND OF THE INVENTION

Field of the Invention

The present invention relates to underwater acoustical systems, methods of using underwater acoustical systems, and methods for processing and using the data they produce. In particular, the invention relates to survey systems including multibeam sonar systems capable of obtaining multi-perspective ensonification data.

Discussion of the Related Art

A month after the Titanic struck an iceberg in 1912, English meteorologist Lewis Richardson filed a patent at the British Patent Office for an underwater ranging device. Modern day successors to Richardson's invention are often referred to as SONAR (sound navigation and ranging) devices. Among these devices are ones using transducer arrays to project sound or pressure waves through a liquid medium and transducer arrays to receive corresponding echoes from features that scatter and/or reflect impinging waves.

Information about these features and their environment can be derived from the echoes. For example, bathymetric surveys provide information about the depth of scattering centers, water column surveys provide information about scattering centers in the water column, and seafloor characterization surveys provide information about scattering centers at the seafloor surface and below the seafloor surface. The diversity and quality of the information returned in echoes may be determined in part by the characteristics of the signal used to excite the projector transducers.

The cost of obtaining this information is strongly influenced by the timeframe during which manpower and equipment is required to acquire the information.

Although some progress towards improving data quality and diversity while reducing the time required to perform an underwater survey has been made, particularly through the use of multibeam echo sounders, long standing technological challenges and risks associated with building and testing costly new survey equipment present significant obstacles to further similar improvements.

SUMMARY OF THE INVENTION

The present invention provides a multi-perspective ensonification system and method. In an embodiment, a multi-perspective ensonification method comprising the steps of; installing a multibeam echo sounder system ("MBES") on a water going vehicle such that one or more transducers in a single MBES projector array and plural transducers in a single MBES hydrophone array are in a Mills Cross arrangement; modeling a waterbody with a plurality of "j" superposed layers ($l_1 \ldots l_j$) having respective layer thicknesses $t_1 \ldots t_j$), each of the j layers having a layer entry sound speed and a layer exit sound speed such that a set of (j+1) sound speed values ($c_1, c_2 \ldots c_{j+1}$) characterize the sound speed profile through the layers; designing a vehicle route and traversing the route such that during MBES operation along the route i) plural primary areas are ensonified, plural secondary areas are ensonified, each primary area is overlapped by a respective secondary area, and iv) for each overlap a first echo originating therein traverses a first path to the MBES and a second echo originating therein traverses a second path to the MBES at a location different from the first; via a travel time corresponding to each echo, modeling the propagation of sound through the waterbody to locate in three dimensions a reflector that returned the echo; one of the dimensions indicating a waterbody depth and the other two dimensions indicating coordinates in a reflector plane parallel to the waterbody free surface; selecting a colocation metric and using the metric to identify groups of reflectors that are colocated in the reflector plane; for each group of colocated reflectors, quantifying disagreements in the waterbody depths corresponding to the reflectors in the group; and, determining a set of adjusted sound speed values that tends to simultaneously reduce the disagreement within each group of depth estimates.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIGS. 3A-G show a process using the MBES of FIG. 1A for testing sound speeds used in depth estimates.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

Survey System

Figure 1A:
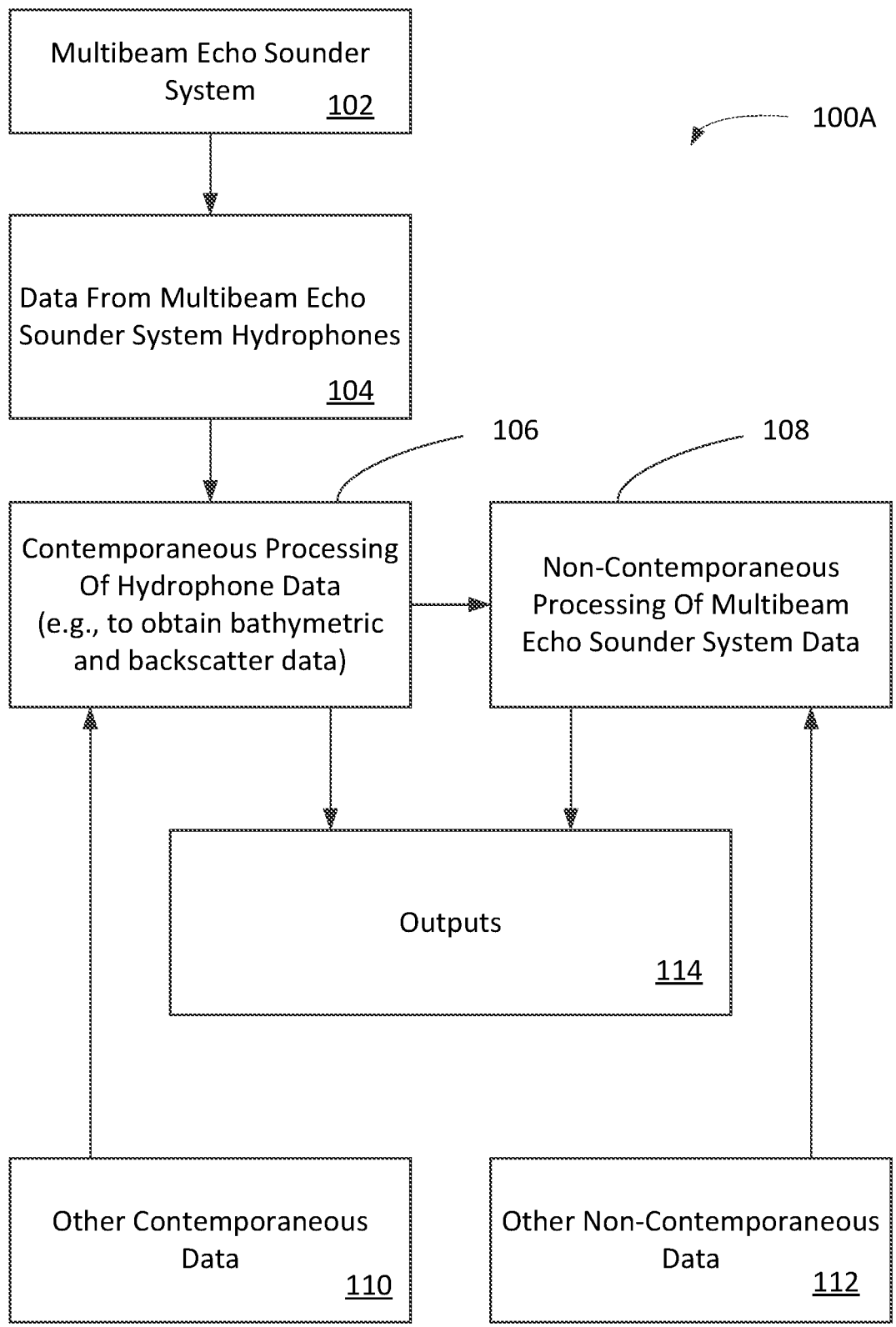
FIG. 1A shows a survey system including a multibeam echo sounder system ("MBES") of the present invention.

FIG. 1A shows a survey system 100A. The survey system includes an echo sounder system such as a multibeam echo sounder system 102 which may be mounted on a surface vehicle or vessel, a remotely operated vehicle, an autonomous underwater vehicle, or the like. As is further described below, echo sounder and/or survey system outputs 114 may be contemporaneous with echo sounder processing of hydrophone data as in some embodiments for bathymetry or non-contemporaneous with processing of hydrophone data as in some embodiments for waterbody bottom classification.

Data acquired by multibeam echo sounder systems 104 includes data from echo sounder listening devices such as hydrophones (e.g., transducers) that receive echoes which are related to the acoustic/pressure waves emanating from the echo sounder projectors but have returned by virtue of an interaction with inhomogeneities of many kinds. The interactions may take the form of reflection or scattering. The inhomogeneities, also known as reflectors and/or scattering centers, represent discontinuities in the physical properties of the medium. Exemplary scattering centers may be found in one or more of i) an ensonified volume of the waterbody such as a water column, ii) upon the ensonified surface of the bottom, or within the ensonified volume of the sub-bottom.

Scattering centers of a biological nature may be present in the water column, as they are a part of the marine life. Scattering centers of a nonbiological nature may be present in the water column in the form of bubbles, dust and sand particles, thermal microstructure, and turbulence of natural or human origin, such as ships' wakes. Scattering centers on the surface of the bottom may be due to the mechanical roughness of the bottom, such as ripples, or be due to the inherent size, shape and physical arrangement of the bottom constituents, such as mud, sand, shell fragments, cobbles and boulders, or due to both factors. Scattering centers in the sub-bottom may be due to bioturbation of the sediments, layering of different sediment materials within the bottom, or buried manmade structures such as pipelines.

Data processing within the echo sounder system may include contemporaneous processing of hydrophone data 106, for example to obtain bathymetric and/or backscatter data. Data processing may also include non-contemporaneous processing of multibeam echo sounder system data 108, for example to characterize the environment including bottom conditions or the water column.

Data processing may include utilization of complementary or other data. For example, contemporaneous processing of hydrophone data 106 may utilize contemporaneous 110 and/or non-contemporaneous 112 data such as contemporaneously collected global positioning system ("GPS") data, sound speed measurements, attitude, and navigational information. For example, non-contemporaneous processing of echo sounder system data may utilize contemporaneous 110 and/or non-contemporaneous 112 data such as non-contemporaneously collected waterbody bottom composition data and tidal records.

Figure 1B:
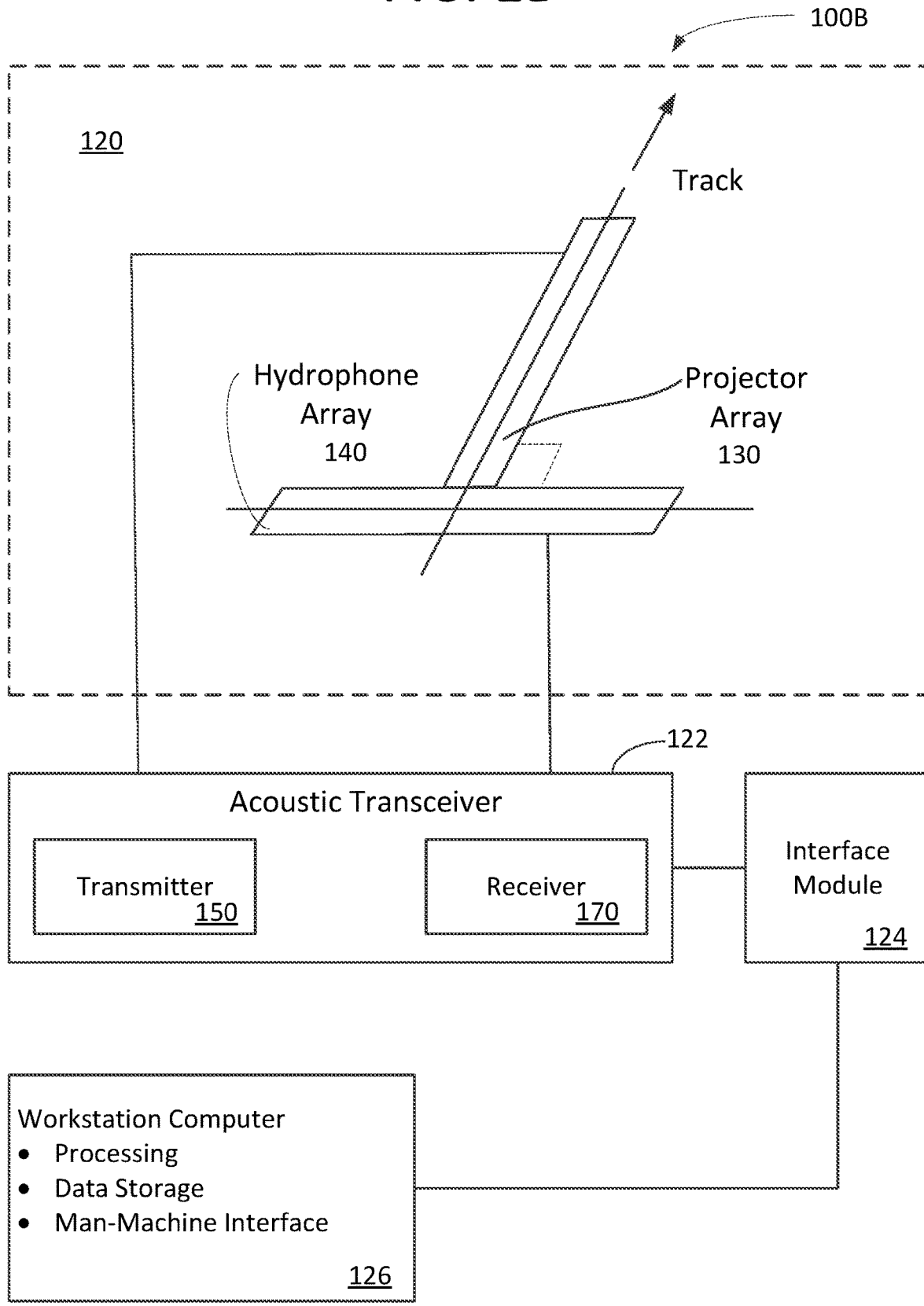
FIG. 1B shows an embodiment of at least portions of the MBES of FIG. 1A.

FIG. 1B shows portions of an exemplary multibeam echo sounder system ("MBES") 100B. The echo sounder system includes a transducer section 120 and an acoustic transceiver 122. The echo sounder system may include a transceiver interface such as an interface module 124 and/or a workstation computer 126 for one or more of data processing, data storage, and interfacing man and machine. Exemplary transducers, shown here in a Mills Cross arrangement 120, include a transmitter or projector array 130 and a receiver or hydrophone array 140. Projectors in the projector array may be spaced along a line that is parallel with a keel line or track of a vehicle or vessel to which they are mounted which may be referred to as an along track arrangement. In some embodiments, a receiver of the transceiver 122 has an operating frequency range matched with that of the projectors and/or the hydrophones.

During echo sounder operation, sound or pressure waves emanating from the projector array travel within a body of water and possibly within the bottom beneath the body of water and in doing so may undergo interactions, such as reflections or scattering, which disturb the propagation trajectory of the pressure waves. Some of the reflections or echoes are "heard" by the hydrophone array. See for example the disclosure of Et al, U.S. Pat. No. 3,144,631, which is included herein by reference, in its entirety and for all purposes.

The acoustic transceiver 122 includes a transmitter section 150 and a receiver section 170. The acoustic transceiver may be configured to transmit to a single projector array 130 and to receive from a single hydrophone array 140. In some embodiments, such a transceiver may be said to operate with a single transmitter array and a single receiver array. Unless otherwise noted, the term transceiver does not require common transmitter and receiver packaging.

In various embodiments, a single projector array ensonifies the entirety of a swath on a single ping. Here, a projector array may be a single projector array regardless of the geometry, arrangement, or quantity of devices employed. For example, where a plurality of projectors forms a plurality of spatially distinct projector groups, the plural projectors are a single projector array if they are operated to ensonify the entirety of a swath on a single ping.

The echo sounder may further include a means such as an interface module 124 for interconnection with the transceiver 122. This interface module may provide, among other things, a power supply for the transceiver, communications with the transceiver, communications with the workstation computer 126, and communications with other sources of data such as a source of contemporaneous GPS data.

The workstation computer 126 may provide for one or more of data processing such as data processing for visualization of survey results, for data storage such as storage of bathymetry data and backscatter data, for user inputs, and for display of any of inputs, system status, and survey results.

Mills Cross Transducer Arrangement

Figure 2A:
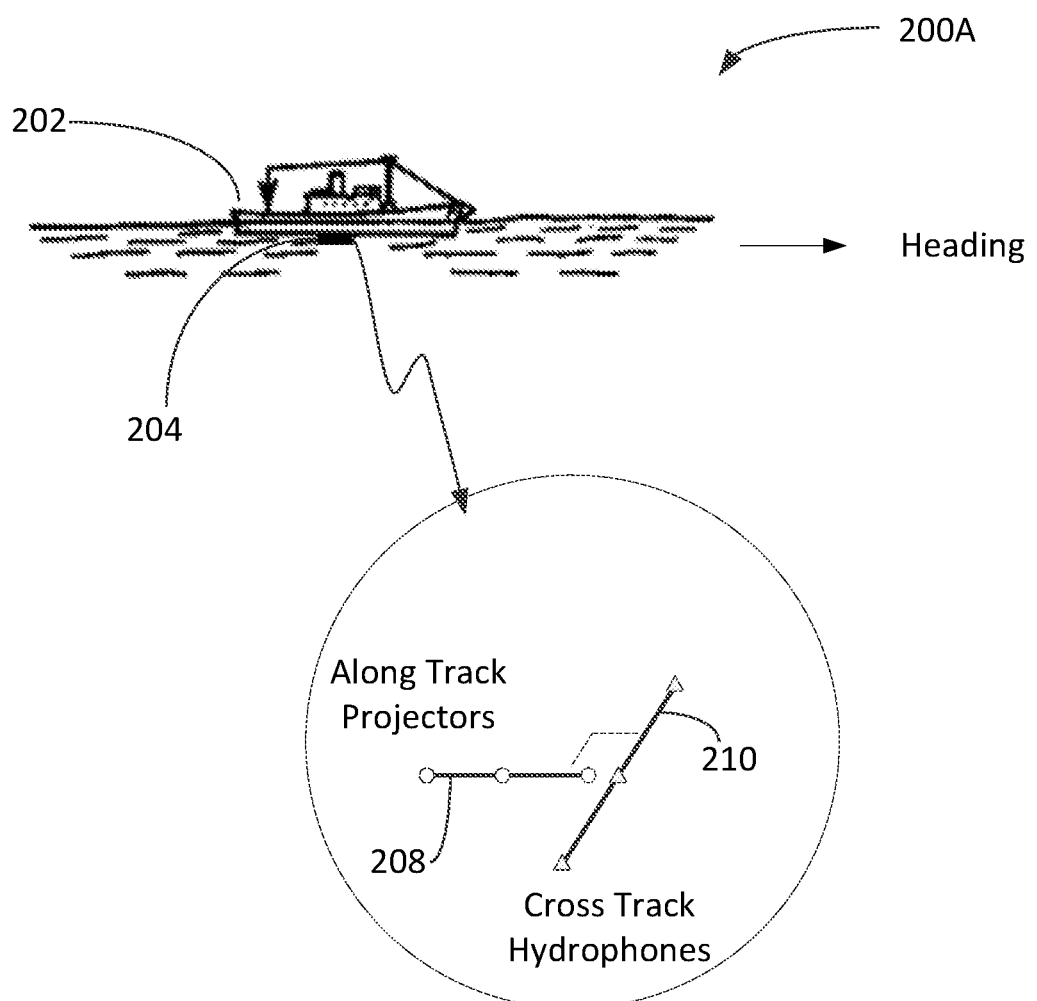
FIG. 2A shows a vessel equipped with a Mills Cross type arrangement of transducer arrays for use with the MBES of FIG. 1A.
Figure 2B:
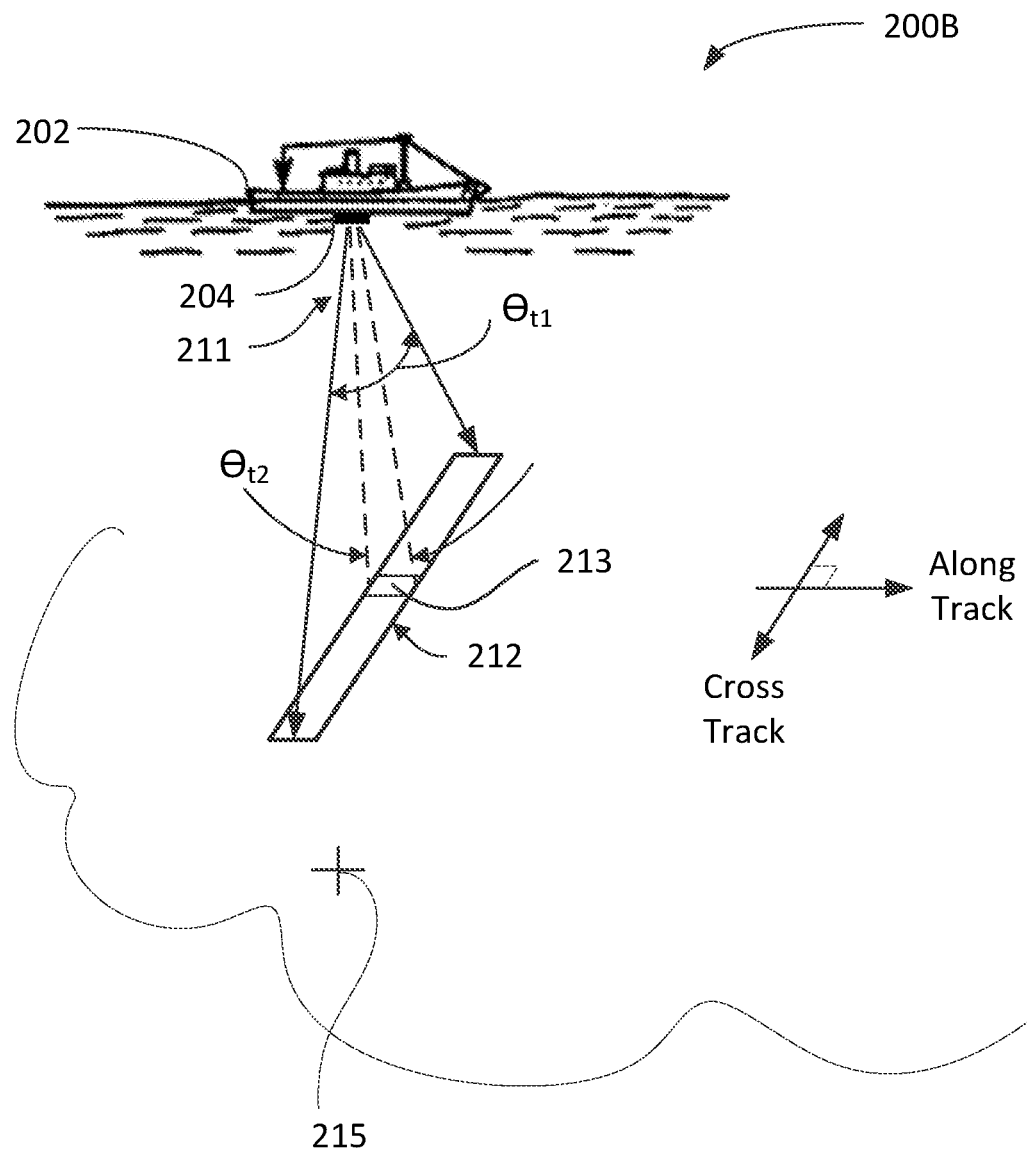
FIG. 2B shows schematically an MBES fan such as a fan resulting from operation of the echo sounder system of FIG. 1A.

FIGS. 2A-B show an exemplary vessel equipped with a multibeam echo sounder 200A. See for example the echo sounders of FIGS. 1A-B. As seen in FIG. 2A, an MBES array package 204 is affixed to a vessel 202, for example to a bottom of the vessel.

Within the array package 204 is an along track array of projectors 208 and a cross track array of hydrophones 210. The projector array is for excitation by an echo sounder transmitter message. The hydrophone array is for receiving echoes of the transmitted message.

As explained below, a crossed array arrangement such as a Mills Cross arrangement of the projector and hydrophone arrays enables the echo sounder to operate with crossed transmit and receive beams wherein the cross intersection identifies a particular waterbody location, area, or cell. The crossed arrays may be in a perpendicular or a substantially perpendicular arrangement. Substantially perpendicular refers to generally small deviations from perpendicular caused by any of array assembly tolerances, mounting tolerances, adjustment tolerances, and the like.

Echoes Returned from Particular Locations

FIG. 2B shows bottom ensonification 200B. In particular, an across track strip or fan of a waterbody bottom 212 is ensonified by the projector array 208. Note the along track projector array 208 ensonifies an across track fan 212. As shown, the projected beam 211 has a wide across track aperture angle $\theta_{t1}$ as compared with a relatively narrow along track aperture angle $\theta_{t2}$. Echoes from this ensonified fan are received by the hydrophone array 210.

In various embodiments, MBES receiver beam steering enables subdivision of the fan 212 into a series of zones. This subdivision into zones enables identification of an echo returned from a particular zone or location 213 on the waterbody bottom 215.

Survey Perspectives

Notably, when the fan 212 is ensonified, the vessel is in a particular position relative to the waterbody bottom 215. As such, the echo returned from the waterbody bottom location 213 may be said to have been acquired from a particular perspective with the MBES in a particular position relative to the waterbody bottom location.

As discussed below, when echo data for a particular waterbody bottom location includes data from multiple different perspectives, this data can be used to test assumptions made about the environment that propagates the echoes.

Echoes from Multiple Perspectives

Multi-perspective ensonification includes a process of operating MBES projectors at multiple vessel locations such that a site on the waterbody bottom is ensonified multiple times from multiple different perspectives.

For example, when the MBES projectors are operated at location (longitude 1, latitude 1), echo data ed1 from a zone z1 within the ensonified area is acquired. Later in time, when the MBES projectors are operated at location (longitude 2, latitude 2), echo data ed2 from a zone z2 that overlaps zone z1 may be acquired.

Where zones $z_1$ and $z_2$ are at least partially superimposed, an overlap is defined. The site may be ensonified from multiple perspectives and echo data may be acquired from multiple perspectives. In some embodiments, different perspectives result when the MBES pitch angles ensonifying zones $z_1$ and $z_2$ differ.

Various terminology may be used to refer to this and similar processes. For example, acquiring multiple echoes from the same site may be referred to as a part of a multi-perspective survey, multi-echo ray tracing, multi-look echo sounding, and/or multi-perspective ensonification, echoes, or queries.

Survey Plans

Figure 2C:
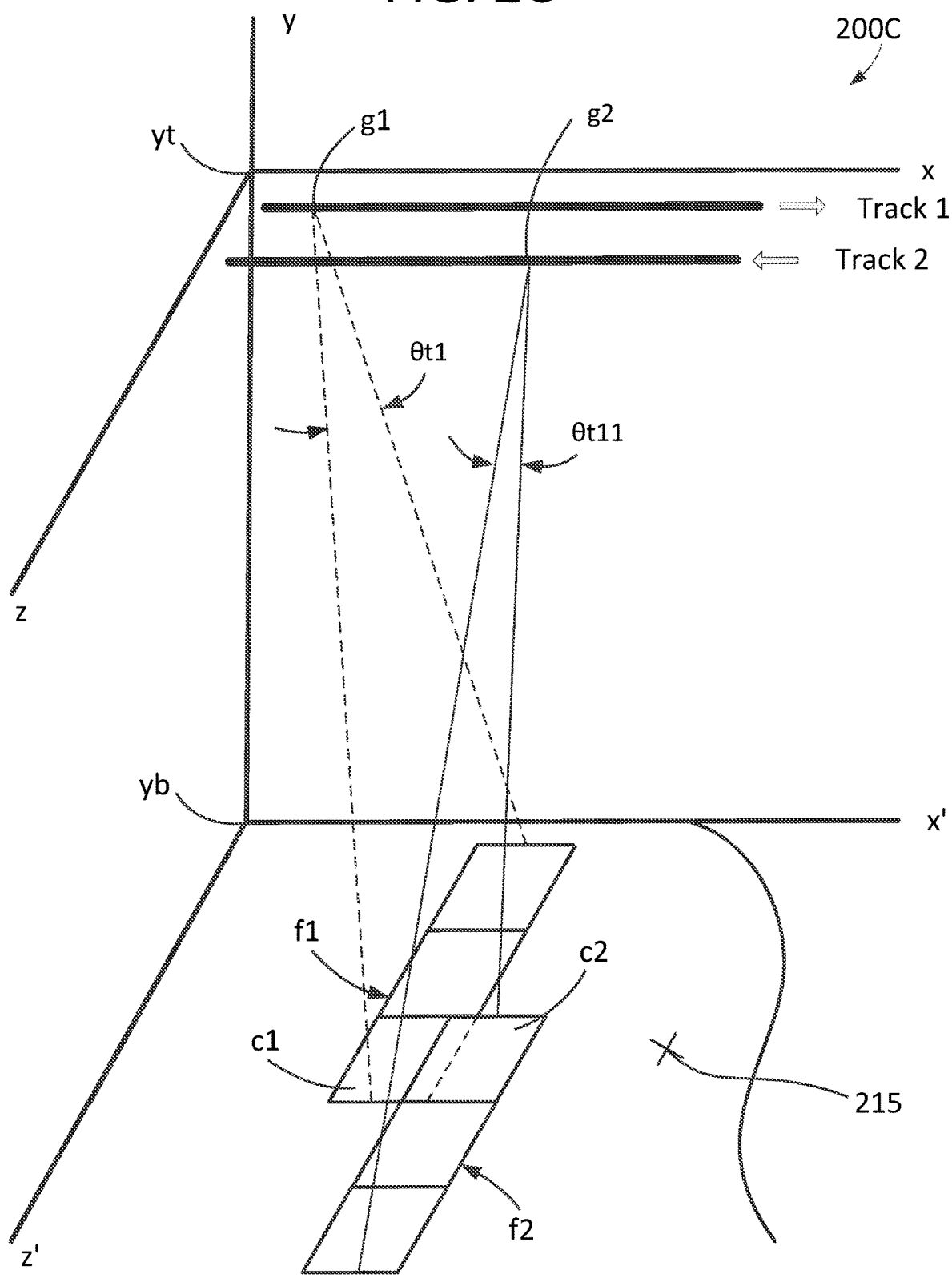
FIGS. 2C-D show an antiparallel track survey plan carried out using the MBES of FIG. 1A.
Figure 2D:
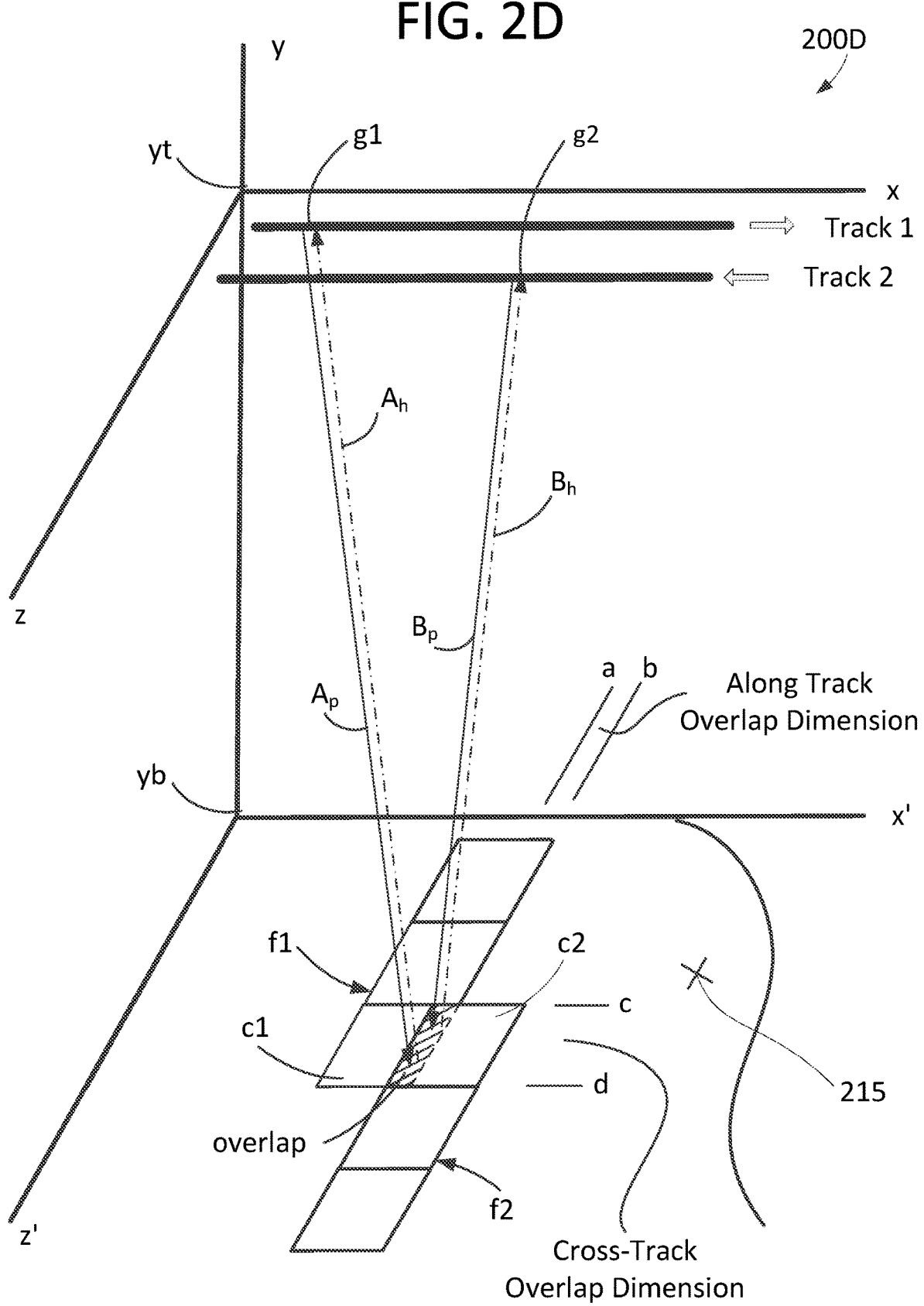

FIGS. 2C-D show an antiparallel track survey plan aimed at acquiring multi-perspective survey data 200C-D.

As shown in FIG. 2C, an MBES transducer plane x-z is at level yt and a waterbody bottom 215 plane x'-z' is at level yb. Survey vessel tracks are located in the upper x-z plane. As shown, the survey vessel movement along a first track Track 1 is parallel to and opposite of survey vessel movement along a second track Track 2. In some embodiments, deviations from parallel tracks arise from vessel instrument measurement inaccuracies, course and or heading errors arising from sea conditions, and the like. In some embodiments similar multi-perspective survey results are provided by non-opposed track directions.

Operation of MBES projectors on a vessel traversing Track 1 may, with a beam angle of θt1, ensonify a first waterbody bottom fan f1. And, operation of the MBES projectors while traversing Track 2 may, with a beam angle of θt11, ensonify a second waterbody bottom fan f2. The beam angles may be equal or not.

Notably, when fan f1 overlaps fan f2 a portion of the waterbody bottom is ensonified twice. As explained below, a first ensonification from Track 1 is from a first perspective and a second ensonification from Track 2 is from a second perspective.

As shown in FIGS. 2C-D, MBES operation on Track 1 results in ensonification of fan f1 which includes ensonification of cell c1 and ensonification Ap of a site within cell c1. In similar fashion, MBES operation on Track 2 results in ensonification of fan f2 which includes ensonification Bp of the same site within cell c2. Temporally, ensonification $A_p$ and its echo $A_h$ may precede ensonification $B_p$ and its echo $B_h$.

This example shows an antiparallel track survey plan where a site defined by an overlap (an overlap, site, or overlap site) is ensonified from a first perspective on Track 1 and from a second perspective on Track 2. In particular, the first perspective is the location of g1 on Track 1 relative to the overlap site and the second perspective is the location of g2 on Track 2 relative to the overlapped.

Figure 2E:
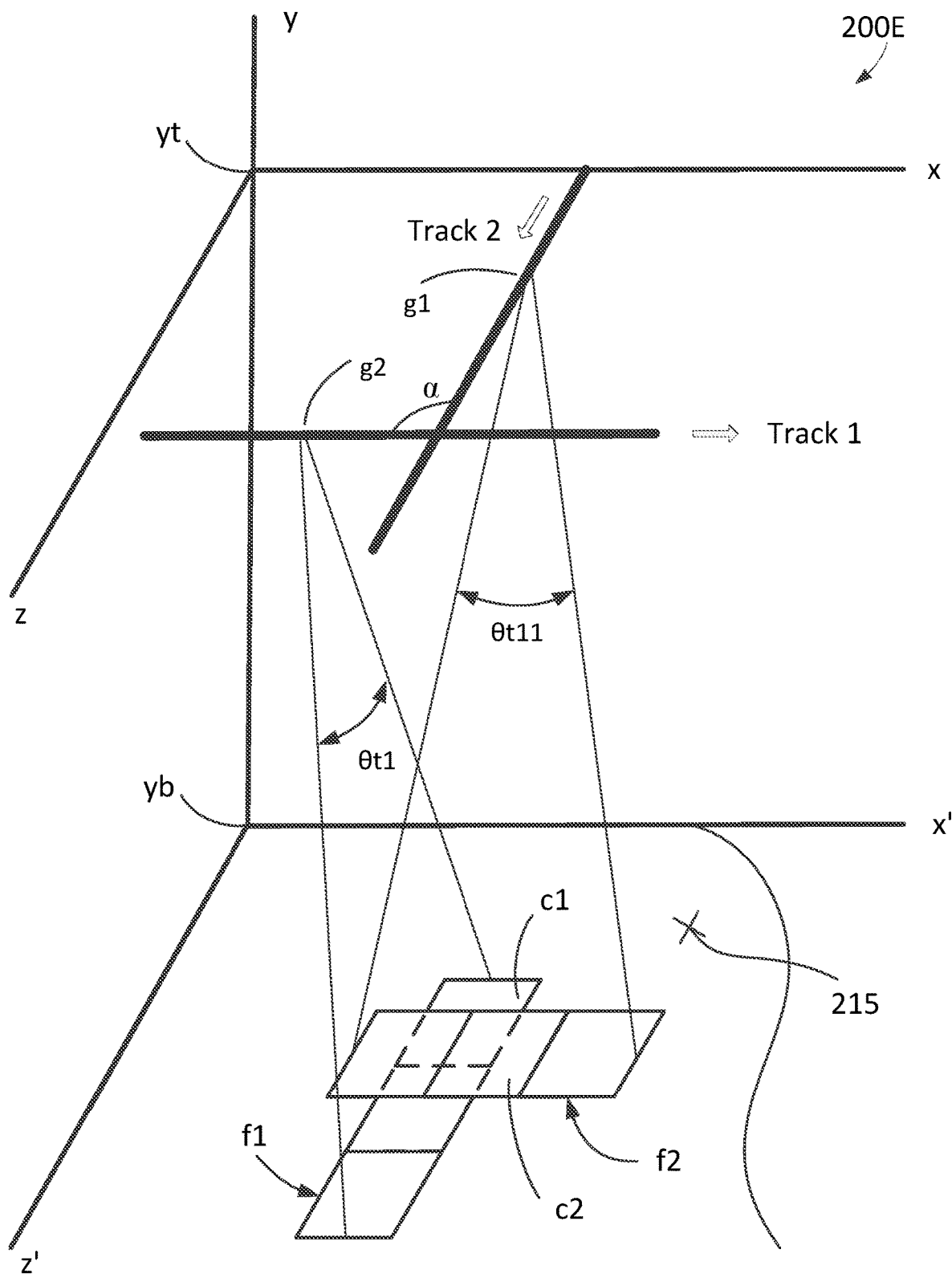
FIGS. 2E-F show a cross track survey plan carried out using the MBES of FIG. 1A.
Figure 2F:
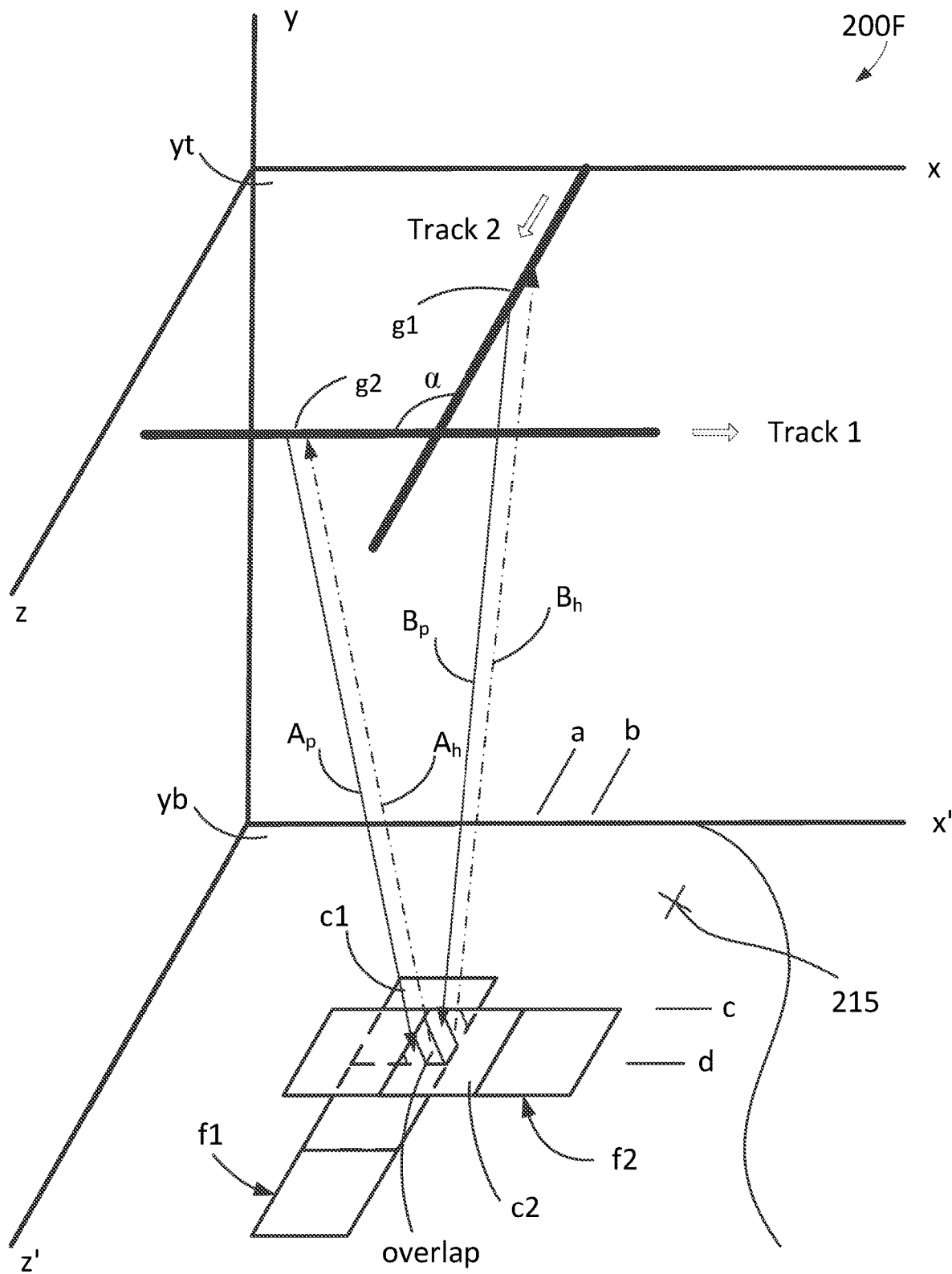

FIGS. 2E-F show a cross track survey plan aimed at acquiring multi-perspective survey data 200E-F.

As shown in FIG. 2E, an MBES transducer plane x-z is at level yt and a waterbody bottom 215 plane x'-z' is at level yb. Survey vessel tracks, Track 1 and Track 2, are located in the upper x-z plane. As shown, the tracks cross at an angle α. In some embodiments, angle α is about a right angle with deviations subject to vessel instrument measurement inaccuracies, course and or heading errors arising from sea conditions, and the like. In various embodiments the survey vessel direction of movement along either track may be reversed.

Operation of MBES projectors on a vessel traversing Track 1 may, with a beam angle of θt1, ensonify a first waterbody bottom fan f1. And, operation of the MBES projectors while traversing Track 2 may, with a beam angle of θt11, ensonify a second waterbody bottom fan f2. The beam angles may be equal or not.

Notably, when fan f1 overlaps fan f2 a portion of the waterbody bottom is ensonified twice. As explained below, a first ensonification from Track 1 is from a first perspective and a second ensonification from Track 2 is from a second perspective.

As shown in FIGS. 2E-F, MBES operation on Track 1 results in ensonification of fan f1 which includes ensonification of cell c1 and ensonification Ap of a site within cell c1 and a corresponding echo Ah. In similar fashion, MBES operation on Track 2 results in ensonification of fan f2 which includes ensonification Bp of the same site within cell c2 and a corresponding echo Bh. Temporally, ensonification $A_p$ and its echo $A_h$ may precede ensonification $B_p$ and its echo $B_h$.

This example shows a cross track survey plan where an overlap site is ensonified from a first perspective on Track 1 and from a second perspective on Track 2. In particular, the first perspective is the location of g1 on Track 1 relative to the overlap site and the second perspective is the location of g2 on Track 2 relative to the overlap site.

Figure 2G:
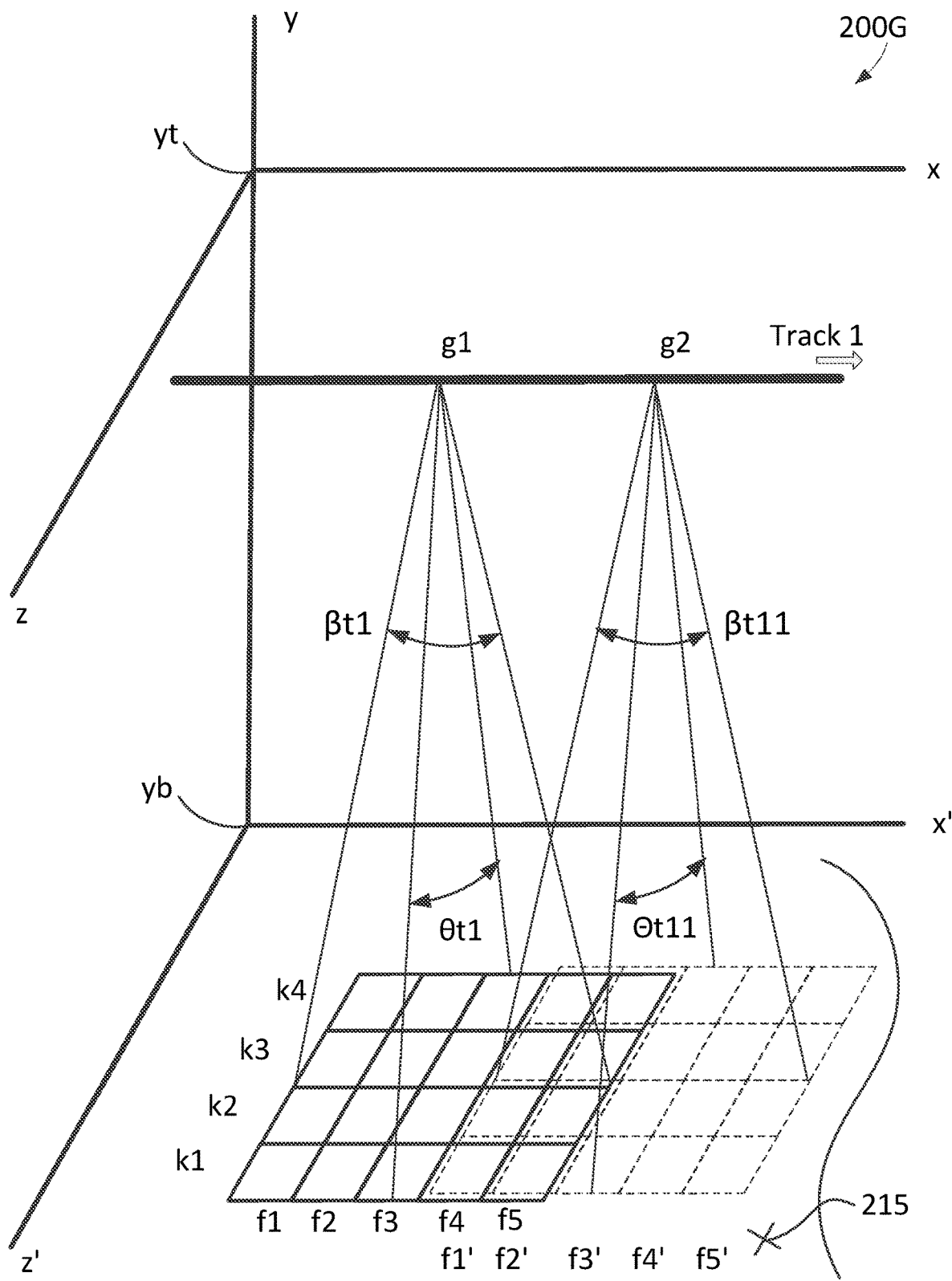
FIGS. 2G-H show a same track survey plan carried out using the MBES of FIG. 1A.
Figure 2H:
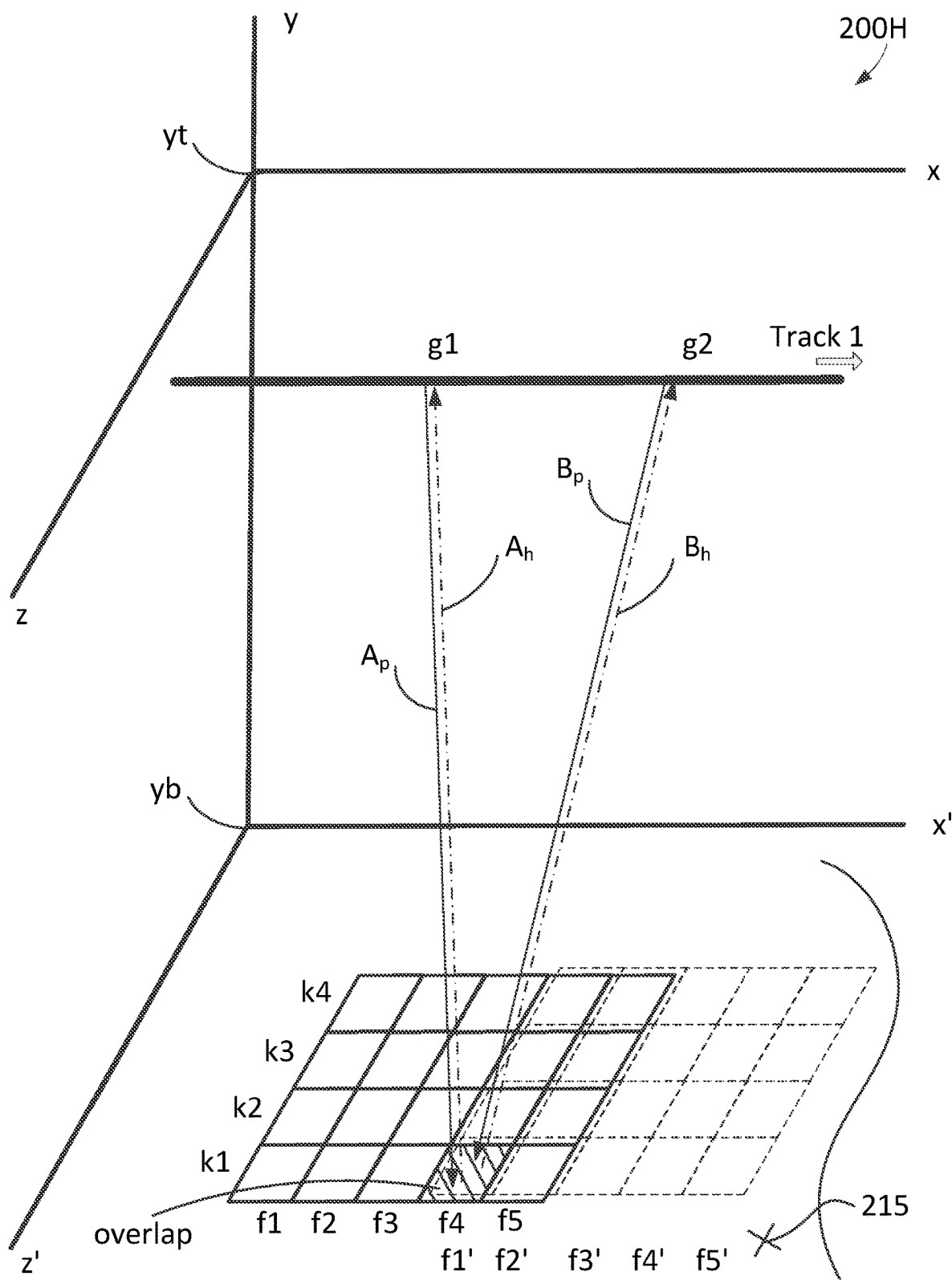

FIGS. 2G-H show a same track survey plan aimed at acquiring multi-perspective survey data 200G-H.

As shown in FIG. 2G, an MBES transducer plane x-z is at level yt and a waterbody bottom 215 plane x'-z' is at level yb. Survey vessel Track 1 is located in the upper x-z plane. In some embodiments, Track 1 is a straight line. And, in some embodiments Track 1 deviates from a straight line. For example, where Track 1 is about a straight line, deviations from a straight line path include deviations due to vessel instrument measurement inaccuracies, course and or heading errors arising from sea conditions, and the like. In various embodiments the survey vessel direction of movement along the track may be reversed.

An early operation of MBES projectors on a vessel traversing Track 1 may, with a cross track beam angle of θt1, ensonify a first plurality of waterbody bottom fans f1-f5. As shown, the fans f1-f5 extend between an along track angle βt1.

A later operation of the MBES projectors while traversing Track 1 may, with a beam angle of θt11, ensonify a second plurality of waterbody bottom fans f1'-f5'. As shown, the fans f1'-f5' extend between an along track angle βt11. The angles θt1, βt11 may be equal or not. The angles βt1, βt11 may be equal or not.

As shown, the early MBES projector operation produces a grid of cells located by fan f1-f5 and by zone k1-k4. For example a cell f1, k1 is ensonified by early MBES operation while a cell f5', k1 is ensonified by later MBES operation. These cells do not overlap.

In another example a cell f4, k1 is ensonified by early MBES operation while the same cell f1', k1 is ensonified by later MBES operation. These cells overlap. As explained below, early MBES operation and later MBES operation provides ensonification of cell f4, k1 from a first perspective at g1 along Track 1 and ensonification of overlapping cell f1', k1 from a second perspective at g2 along Track 1.

As shown in FIG. 2H, early MBES operation on Track 1 at g1 results in ensonification of fans f1-f5 which includes ensonification Ap of cell f4, k1 and a corresponding echo Ah. Later MBES operation on Track 1 at g2 results in ensonification of fans f1'-f5' which includes ensonification Bp of cell f1', k1 and a corresponding echo Bh. Temporally, ensonification $A_p$ and echo $A_h$ may precede ensonification $B_p$ and echo $B_h$.

This example shows a same track survey plan where a site is ensonified from a first and a second perspective along Track 1. In particular, the first perspective is the location of g1 on Track 1 relative to the overlap site and the second perspective is the location of g2 on Track 1 relative to the overlap site.

Waterbody Model

Estimating the propagation path(s) of acoustic energy through a waterbody may be referred to as ray tracing. This ray tracing may involve dividing the waterbody into layers. Tracing sound rays through a body of water may involve dividing the waterbody into layers. With defined layers, physical properties such as the speed of sound may be measured, estimated, or otherwise made available for one or more layers. The value of a particular media property may be held constant or varied, such as linearly varied, within a layer. For example, in a multi-layer media model the speed of sound may be constant within a layer or change with a constant gradient within a layer provided the speed of sound is continuous from layer to layer.

Figure 2I:
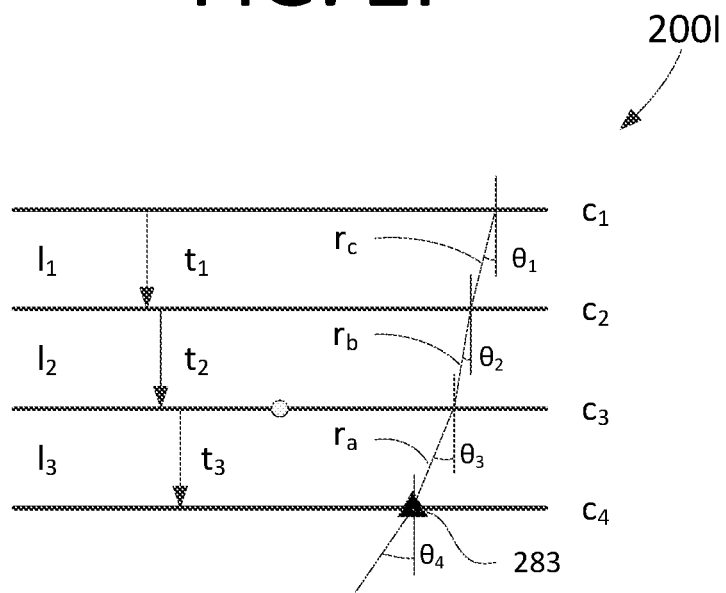
FIGS. 2I-J show an exemplary waterbody model for use with the surveys of FIGS. 2B-H.
Figure 2J:
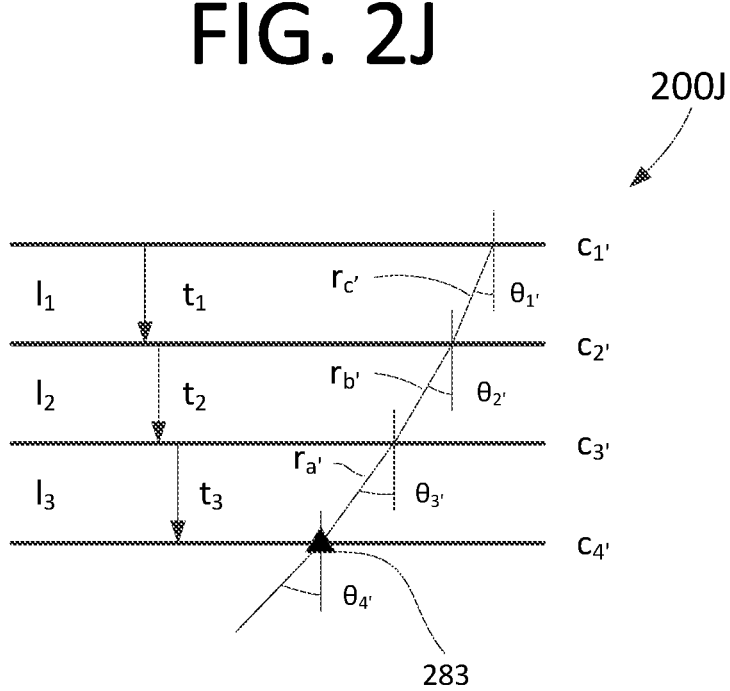

FIGS. 2I-J show an exemplary waterbody model 200I-J. As seen, the waterbody includes three layers (l1, l2, l3), each layer having a corresponding thickness (t1, t2, t3). In each of the figures, four interfaces with corresponding sound speeds (c1, c2, c3, c4) and (c1', c2', c3', c4') demarcate the layers.

FIG. 2I shows a first echo from a point on a waterbody bottom 283 that is traced with three ray segments. In accordance with Snell's law of refraction (sin θx)/cx=(sin θy)/cy), a first ray segment ra exits layer l3 at an angle θ3, a second ray segment rb exits layer l2 at an angle θ2, and a third ray segment rc exits layer l1 at an angle θ1. In various embodiments, the third ray segment rc leaves layer l1 at or near an MBES hydrophone array.

As skilled artisans will appreciate, ray segments like those of FIGS. 2I-J may travel through a layer and/or be modeled as traveling through a layer with no change in sound speed or with various changes in sound speed. For example, sound may travel through a layer with a constant sound speed and experience no change of ray path angle resulting in a straight ray segment. For example, sound may travel through a layer with a constant sound speed gradient and experience a gradual change of ray path angle resulting in a curved ray segment. Notably, the figures do not attempt to replicate curved ray segments. For example, in some embodiments ray angles at layer interfaces may change abruptly with gradual continuous changes thereafter as in a prior layer. For example, in some embodiments the slopes of adjoining rays at layer interfaces may be equal or about equal, for example within 1 to 10 percent difference.

FIG. 2J shows a second echo from the point 283 on the waterbody bottom. Here, a first ray segment ra' exits layer l3 at an angle θ3', a second ray segment rb' exits layer l2 at an angle θ2', and a third ray segment rc' exits layer l1 at an angle θ1'. In various embodiments, the third ray segment leaves layer l1 at or near an MBES hydrophone array.

As will be noted, the ray segments tracing the first echo are characterized by a more severe slope than those tracing the second echo. This shows, among other things, that the first and second echoes from the point on the waterbody bottom 283 correspond to ensonifications from different perspectives as discussed above.

It should be noted that FIGS. 2I-J are based on a particular waterbody model and are merely illustrative. For example, the number of layers used in the model may be 2, 3, 4, 5 or more. For example, the value of the speed of sound may vary with depth.

Testing Sound Speeds

FIGS. 3A-3G show a process for testing sound speeds used in depth estimates 300A-G.

Figure 3A:
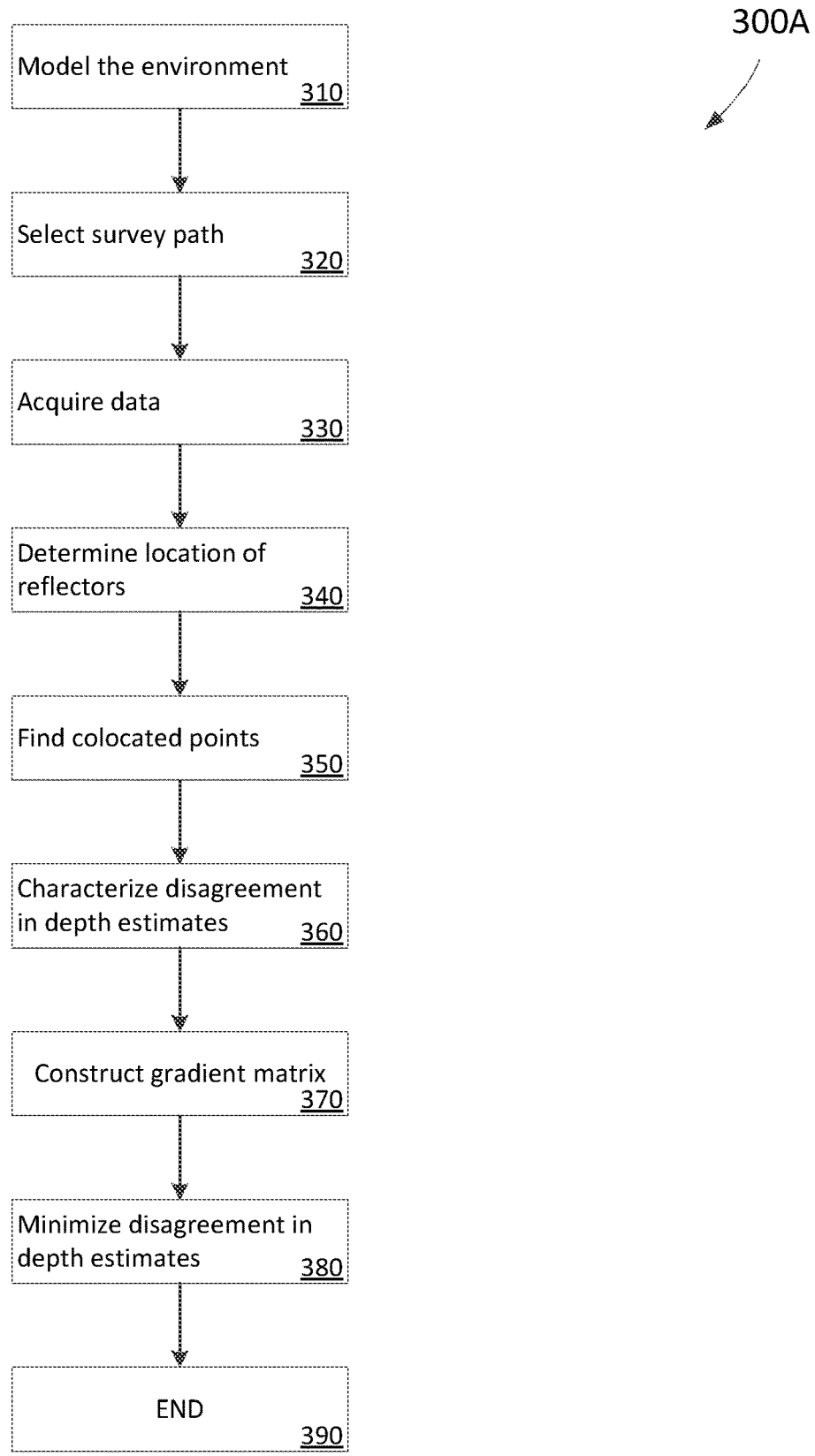

FIG. 3A provides an overview of the process 300A. In a first step, a model of the waterbody where sound speeds at various depths will be estimated is constructed. See for example the models of FIGS. 2I-J. In a second step, a survey path is selected. See for example the survey paths of FIGS. 2A-H and in particular survey paths that provide multi-perspective ensonifications of individual overlap sites. In the third step 330, survey data is acquired when an MBES is operated on board a vessel that follows the selected survey path. From this data, waterbody bottom reflectors are located in a fourth step.

Because it is unlikely that multiple echoes will emanate from the same reflector, groups of reflectors in relatively small areas on the waterbody bottom are assumed to be colocated and to provide multi-perspective echoes from the same location. For example, the waterbody bottom may be divided using a square grid into colocation areas that are one meter on a side. Notably, grid size may vary with water depth owing to beam footprints that vary with depth.

In step 350, colocated reflectors are identified using a method such as the one just described. Because colocated reflectors are found in a small area on the waterbody bottom, the depth estimate made for each of the reflectors should be closely similar or, perhaps within measurement accuracy, the same. Notably, reducing the grid size reduces the variation in actual depths among a group of colocated reflectors.

With the assumption that depths among colocated reflectors should be the same, in a sixth step 360 disagreements in depth estimates are characterized in a quantitative manner. In step seven 370, the sensitivity in depth disagreements to sound speed perturbations is quantified. In step eight 380, the depth estimate disagreements are reduced or minimized by selecting speed of sound values that achieve this result. In an embodiment, the process ends thereafter at step 390.

FIGS. 3B-3G which follow provide a flowchart with process step details 300B-G.

Modeling The Environment

In FIG. 3B, the flowchart starts with modeling the environment in step 310. As shown alongside the flowchart, a waterbody model 312 provides four layers l1-l4 with respective layer thicknesses t1-t4. The sound speeds entering and leaving the waterbody are c1 and c5 while the sound speeds at layer boundaries are c2-c4. Angles of refraction entering each layer are θ1-θ4 and the angle of refraction leaving layer l4 is θ5.

As skilled artisans will appreciate, ray segments like those of the waterbody model 312 may travel through a layer and/or be modeled as traveling through a layer with no change in sound speed or with various changes in sound speed. For example, sound may travel through a layer with a constant sound speed and experience no change of ray path angle resulting in a straight ray segment. For example, sound may travel through a layer with a constant sound speed gradient and experience a gradual change of ray path angle resulting in a curved ray segment. Notably, the figures do not attempt to replicate curved ray segments. For example, in some embodiments ray angles at layer interfaces may change abruptly with gradual continuous changes thereafter as in a prior layer. For example, in some embodiments the slopes of adjoining rays at layer interfaces may be equal or about equal, for example within 1 to 10 percent difference.

A table alongside the flowchart 314 includes selected variables and their descriptions.

Known variables in the table are travel time tt for an acoustic message emitted by the projectors 208 and received by the hydrophones 210, sound speed at the launch c1, launch angle θ1. User defined variables are the thicknesses t1-t3 of layers of waterbody layers l1-l3.

Initially estimated variables in the table are sound speeds c2-c5 and angles of refraction θ2-θ5. The unknown variable in the table is the thickness of layer l4.

Selecting Survey Path

Figure 3C:
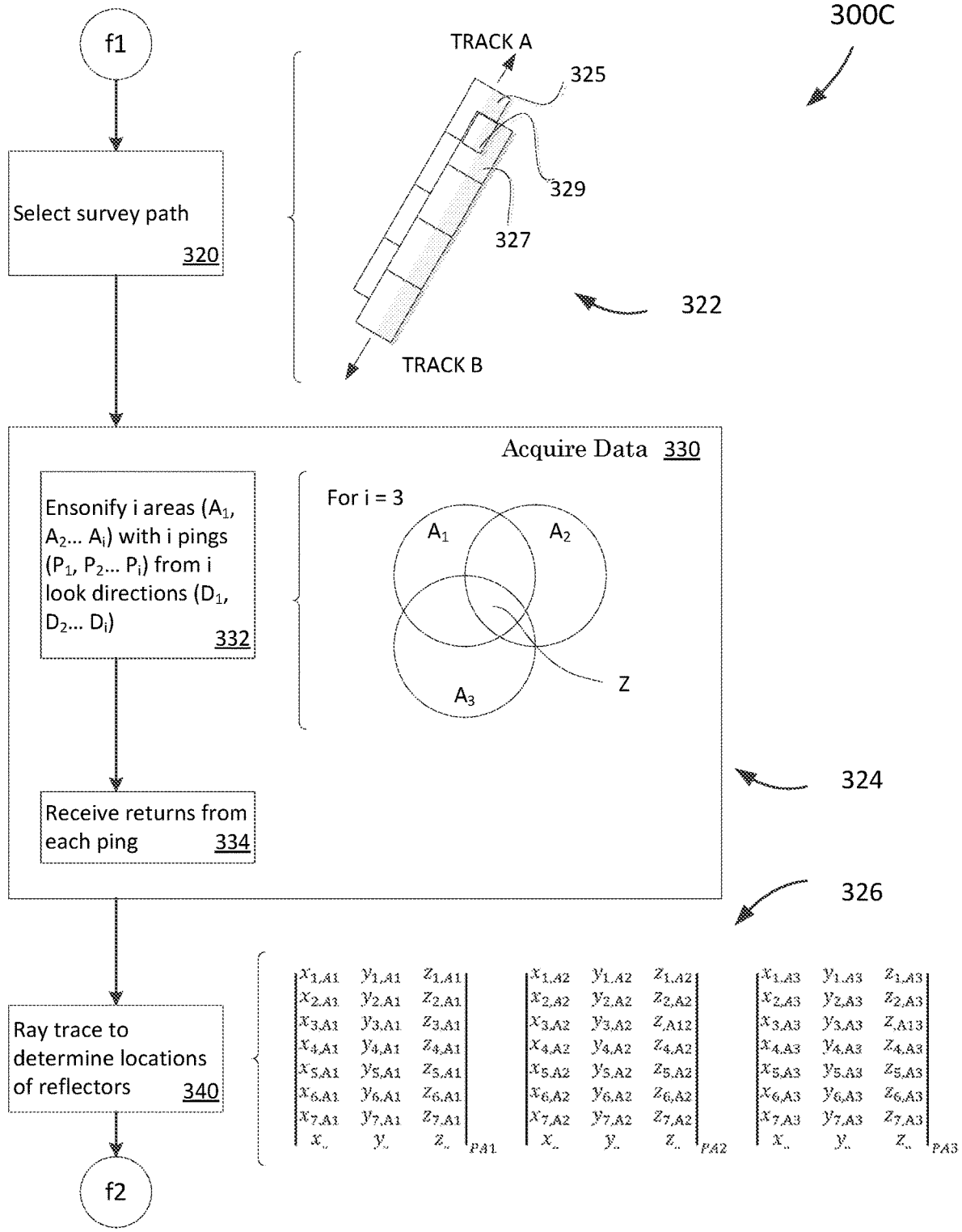

FIG. 3C is a continuation 300C of the flowchart of FIG. 3B as indicated by link f1. In step 320 a survey path is selected. As shown alongside the flowchart, the survey path selected is an antiparallel track path 322. Track B overlaps Track A, the direction of Track B being opposite the direction of Track A.

As discussed above, with this survey path the ensonification of a Track A cell 325 and the subsequent ensonification of an overlapping Track B cell 327 is intended to provide echoes from multiple perspectives. In particular, echoes resulting from the first ensonification of colocated reflectors are from a perspective other than that of echoes resulting from the second ensonification of the colocated reflectors.

Concerning selection of an antiparallel tracks survey path, the discussion above shows any of several survey paths might be selected including parallel tracks in the same or opposed directions, cross tracks in similar or opposed directions, and same track forward and backward look directions. Further, any combinations of these paths may be chosen to provide multiple echoes from differing perspectives from each of plural reflectors.

Notably, while this discussion speaks of echoes from multiple, e.g., two different, perspectives, a group of colocated reflectors may return echoes from many different perspectives.

Acquiring Data

An acquired data step 330 includes an ensonification step 332 where multiple "i" areas (Ai, A2 ... Ai) are ensonified with "i" pings (P1, P2 ... Pi) to obtain echoes from "i" perspectives. Also included is a receive returns step 334 where waterbody bottom reflectors return echoes from these pings and round trip travel times of those echoes are measured for all beams, fans, and pings.

As shown alongside the flowchart, an example with i=3 is shown. For illustrative purposes the waterbody bottom areas A1, A2, A3 are shown as circles. Reflectors located in the common area "Z" where the three circles overlap will return echoes from three different perspectives.

Notably, what is presented here is exemplary. For example, just as two areas may provide an intersecting zone z, so too may many more than two or three overlapping areas provide an intersecting zone.

Ray Tracing to Determine Reflector Locations

Given measured travel time information and the modeled sound speed profile, in step 340 acoustic paths through the layers of the waterbody model 312 between the MBES and ensonified reflectors are modeled. Within each of the areas A1, A2, A3 ray tracing to reflectors provides coordinates x, y, z specific to each reflector. As shown, matrices 326 for respective areas PA1, PA2, PA3 provide coordinates for reflectors therein. Here, seven or more sets of reflector coordinates appear in each matrix and indicate returns from corresponding reflectors in each of the areas. Coordinate indicia indicate a reflector number (e.g., 1-7) and an area that confines the reflector (e.g., A1, A2, A3).

Finding Colocated Reflectors

Figure 3D:
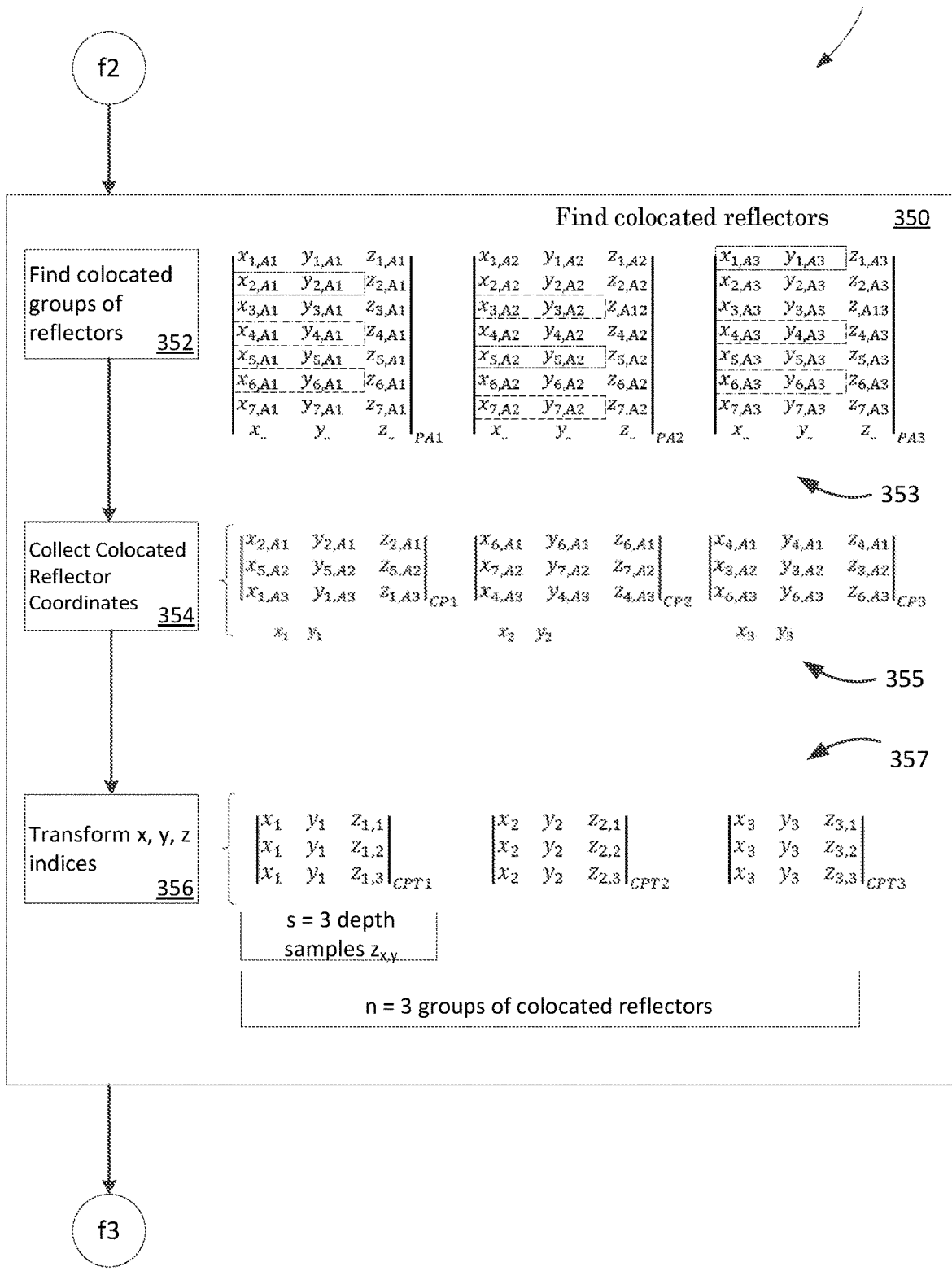

FIG. 3D is a continuation 300D of the flowchart of FIG. 3C as indicated by link f2. Here, groups of reflectors may be considered as "colocated" or as representative of a single location on a waterbody bottom such as a location having a single or substantially invariant depth such as a depth that varies within a survey map tolerance, survey instrument tolerance, selected tolerance, or similar industry tolerance.

A step of finding colocated reflectors 350 includes an identification step 352, a collection step 354, and a rewrite step 356.

In the identification step 352, colocated reflectors are identified as reflectors having the same or similar x, y coordinates across all three of the matrices PA1, PA2, PA3 are marked 353.

In particular, as shown by the dotted box outlines, coordinate pairs $x_{2,A1}$, $y_{2,A1}$ and $x_{5,A2}$, $y_{5,A2}$ and $x_{1,A3}$, $y_{1,A3}$ identify a $1^{st}$ same or similar waterbody bottom location. As shown by dashed box outlines, coordinate pairs $x_{6,A1}$, $y_{6,A1}$ and $x_{7,A2}$, $y_{7,A2}$ and $x_{4,A3}$, $y_{4,A3}$ identify a $2^{nd}$ same or similar waterbody bottom location. And, as shown by dashed and dotted box outlines, coordinate pairs $x_{4,A1}$, $y_{4,A1}$ and $x_{3,A2}$, $y_{3,A2}$ and $x_{6,A3}$, $y_{6,A3}$ identify a $3^{rd}$ same or similar waterbody bottom location.

Reflector coordinates may be said to identify a similar location when they are situated within a selected colocation area, for example within an area of one square meter. Reflector coordinates may be said to identify a similar location when they lie within a colocation circle, for example a circle having a diameter of one meter. Similarly located reflectors may be identified by overlaying and dividing the waterbody bottom with a pattern such as a grid, regular grid, or square grid and designating each area so identified as a colocation area. For example, where a regular grid such as a square grid is used, areas identified within the grid may be colocation areas such that reflectors falling within a particular grid defined area are colocated reflectors with similar x, y coordinates.

In the collection step 354, the coordinates of similarly located reflectors are collected 355 in three matrices CP1, CP2, CP3. As suggested by the coordinate indices below the matrices, a simplification in matrix presentation results from rewriting the indices in a manner suggesting that for a given matrix the x,y coordinates are the same or similar.

In the rewriting step 356 illustrated by three matrices 357, the multiple colocated x and y coordinates of the matrices 355 are assigned a single x and y value to represent the group, for example using an average, grid center or area center. See in particular indices of x, y, z, are rewritten in matrices CPT1, CPT2, CPT3 that correspond to matrices CP1, CP2, CP3. Here, remarking the indices of x and y to be the same within a given matrix emphasizes the equality or similarity of the x, y pairs in the matrix, for example $x_1$, $y_1$ for all of the x, y pairs in matrix CPT1.

Notably, the z coordinates are not necessarily equal or similar. As such, they are remarked as $z_{a,b}$ where "a" is constant in a particular matrix and "b" varies from row to row in the matrix. For example, in the first matrix CPT1 the z coordinates by row are $z_{1,1}$, $z_{1,2}$, $z_{1,3}$.

In each of the rewritten matrices CPT1, CPT2, CPT3 a respective location x, y corresponds with three different depth estimates. For example, in CPT1 the location x1,y1 corresponds with depth estimates $z_{a,1}$, $z_{a,2}$, $z_{a,3}$.

Solution Paradigms

In various embodiments, we may assume the depth estimates in each matrix 357 should be the same even though they are not. Equality may be assumed because, for each matrix, the depth estimates correspond with a group of colocated reflectors. As such, the depth estimates in a particular matrix may be viewed as samples or sample values "s" of the same environmental variable at a particular location.

The goodness of this same matrix/same depth assumption depends on variables including the regularity of the waterbody bottom and the characteristic dimension(s) and/or pattern(s) used to identify colocated reflectors.

Whatever the case, various methodologies for testing and/or improving depth estimates may manipulate variables such as sound speed(s) to reduce the variability in depth estimates for each group and/or multiple groups of colocated reflectors.

Characterizing Disagreements in Depth Estimates

Figure 3E:
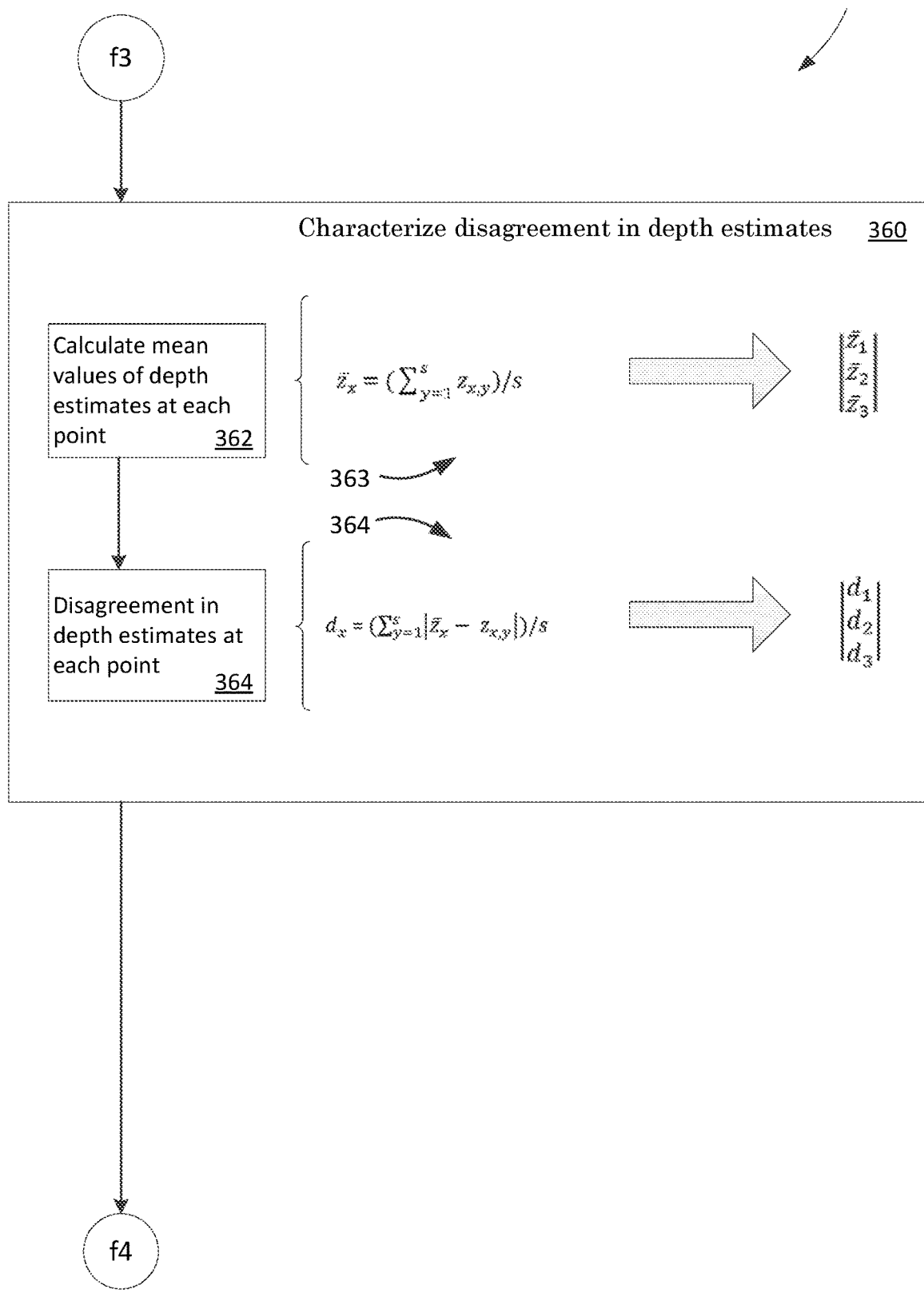

FIG. 3E is a continuation 300E of the flowchart of FIG. 3D as indicated by link f3. Here, a step of characterizing disagreement in depth estimates includes a step establishing a basis to characterize differences 360 and the step of characterizing the disagreement 362.

In particular, step 360 establishes a basis for characterizing differences in depth estimates. For each group of colocated reflectors a mean value matrix z as shown below expresses this basis.

| Mean Value Equation | | Variables | Variable description |
|---|---|---|---|
| $\bar{z}_x = (\Sigma_{y=1}^{s} z_{x,y})/s \Rightarrow$ | $\begin{vmatrix} \bar{z}_1 \\ \bar{z}_2 \\ \bar{z}_3 \end{vmatrix}$ | $\bar{z}_x$ | mean depth for each group x of colocated reflectors |
| | | $z_{x,y}$ | depth at $y^{th}$ reflector in group x of colocated reflectors |
| | | s | number of samples |

Given a basis for characterizing differences in depth estimates, step 364 provides for each group of colocated reflectors a measure of the disagreement among depth estimates as expressed by vector d shown in the equation below.

| Disagreement Equation | | Variables | Variable description |
|---|---|---|---|
| $d_x = (\Sigma_{y=1}^{s}|\bar{z}_x - z_{x,y}|)/s \Rightarrow$ | $\begin{vmatrix} d_1 \\ d_2 \\ d_3 \end{vmatrix}$ | d | disagreement in depth estimate for each group x of colocated reflectors (residuals) |
| | | $\bar{z}_x$ | mean depth for each group x of colocated reflectors |
| | | $z_{x,y}$ | depth at $y^{th}$ reflector in group x of colocated reflectors |
| | | s | number of samples |

Constructing a Gradient Matrix

Figure 3F:
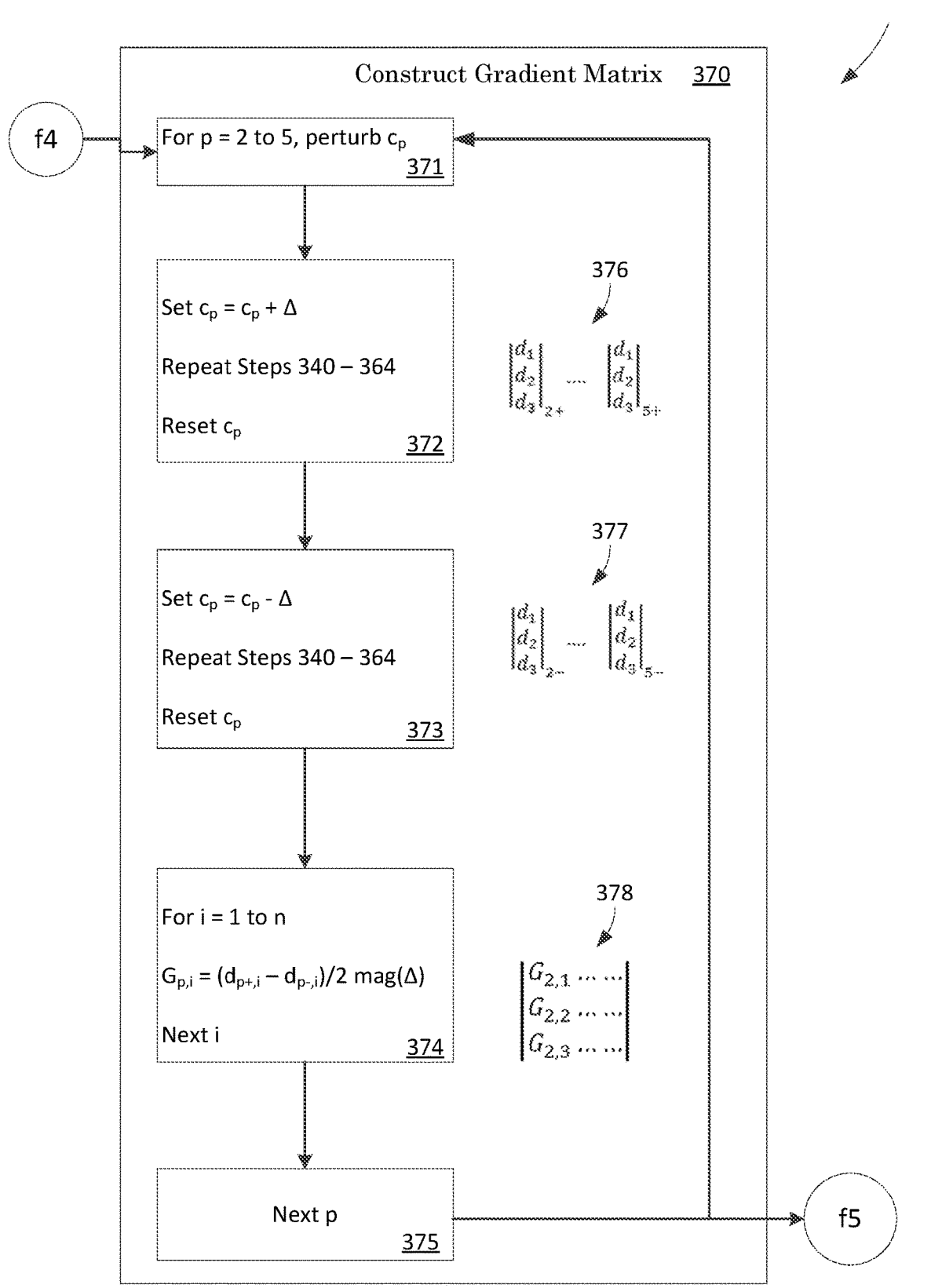

FIG. 3F is a continuation 300F of the flowchart of FIG. 3E as indicated by link f4. The gradient matrix is a metric of the sensitivity of depth estimates to modeled sound speeds and is constructed by first perturbing the values of sound speed $c_2 \ldots c_p$ by a positive increment and then by a negative increment. Then, for each perturbation, steps are repeated including the steps of determining reflector locations 340, finding colocated reflectors 350, and characterizing disagreements in depth estimates 360 with vectors $d_+$ and $d_-$.

In step 371, a counter p counts from 2 to 5 indicating values of the speed of sound $c_2 \ldots c_5$ consistent with a four layer waterbody model having five corresponding values of the speed of sound $c_1 \ldots c_5$ where $c_1$ is a known value of the speed of sound at the launch.

In step 372, a positive perturbation ($+\Delta$) is applied to a $p^{th}$ sound speed value $c_p$. Steps 340-364 are repeated and vector $d_{p+}$ is populated 376. The $p^{th}$ sound speed value $c_p$ is then reset.

In step 373, a negative perturbation ($-\Delta$) is applied to the $p^{th}$ sound speed value $c_p$. Steps 340-364 are repeated and vector $d_{p-}$ is populated 377. The $p^{th}$ sound speed value $c_p$ is then reset.

In step 374, a $p^{th}$ row of the gradient matrix G is populated. In particular, $G_{p,i}=(d_{p+,i}-d_{p-,i})/2 \, \text{mag}(\Delta)$ where counter i varies from 1 to n to populate 378 the columns of the matrix G, each value of i representing the $i^{th}$ group of colocated reflectors. When the last column is populated, counter p indexes to the next value in step 375 and steps 372-374 are repeated. When the last row of the matrix G is populated, the process proceeds to step 382 of the minimize disagreement block 380.

Minimizing Depth Estimate Disagreement

Figure 3G:
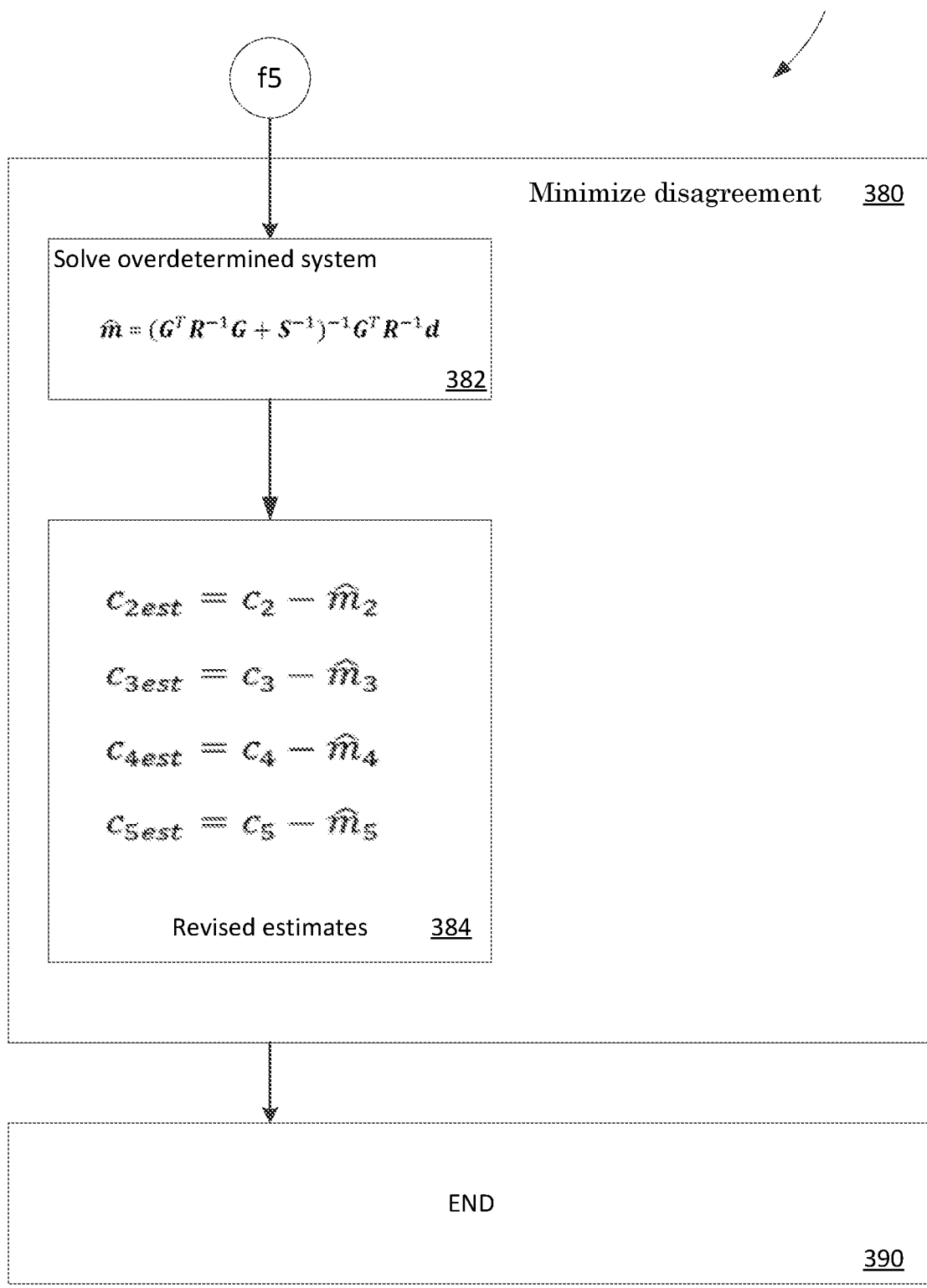

FIG. 3G is a continuation 300G of the flowchart of FIG. 3F as indicated by link f5. In this figure, disagreements among depth estimates in each group of colocated reflectors are simultaneously minimized utilizing conventional least-squares techniques associated with linear algebra.

In step 382, an equation utilizing the gradient matrix G and disagreement in depth estimates vector d provides a vector of corrections mhat to be applied to sound speed values to reduce or minimize depth disagreements. The equation presented 382 is a well-known least-squares minimizing solution whose derivation is available in academic texts such as the text by Munk, Walter, et al., *Ocean Acoustic Tomography* Cambridge University Press, 1995. The equation provides two terms for conveying prior information, if known, about the noise or solutions. The diagonal of matrix R can be populated with the relative sizes of noise variance associated with each observation in vector d. The diagonal of matrix S can be populated with the relative sizes of the elements of mhat.

| Overdetermined System Equation | Variables | Variable description |
|---|---|---|
| $\hat{m} = (G^T R^{-1} G + S^{-1})^{-1} G^T R^{-1} d$ | $\hat{m}$ (mhat) | Vector of corrections to be applied to sound speed values $c_2 \ldots c_5$ |
| | $G^T$ | Transpose of gradient matrix G (interchange of rows and columns) |
| | R | Matrix conveying information about data uncertainty. |
| | $R^{-1}$ | Inverse of R matrix |
| | G | Gradient matrix. |
| | S | Matrix conveying information about model parameter sizes. |
| | $S^{-1}$ | Inverse of S matrix |
| | d | disagreement in depth estimate for each group x of colocated reflectors (residuals) |

In step 384, each of the sound speed values $c_2 \ldots c_5$ is corrected using the correction vector mhat.

| Sound Speed Estimates | Variables | Variable description |
|---|---|---|
| $c_{2est} = c_2 - \hat{m}_2$ | c | sound speed |
| $c_{3est} = c_3 - \hat{m}_3$ | mhat | sound speed correction |
| $c_{4est} = c_4 - \hat{m}_4$ | | |
| $c_{5est} = c_5 - \hat{m}_5$ | | |

Synthesizing a Sound Speed Profile

The above solution procedure is based on a multilayer waterbody model with a known sound speed $c_1$ at launch and initial estimates or otherwise available values of sound speed at the layer interfaces and at the waterbody bottom.

Notably, cases may arise where the only available value(s) of sound speed are sound speed value(s) at launch. For example, a survey conducted with equipment malfunction(s) or human error(s) may result in such a case. For example, a survey conducted with the intent to estimate sound speed values after the survey is conducted may result in such a case.

In some embodiments, the system and method of the present invention may be used to synthesize a sound speed profile. For example, where sound speed at launch is known, the system and method of the present invention may be used to synthesize a sound speed profile through a waterbody modeled with a plurality of layers.

Figure 4:
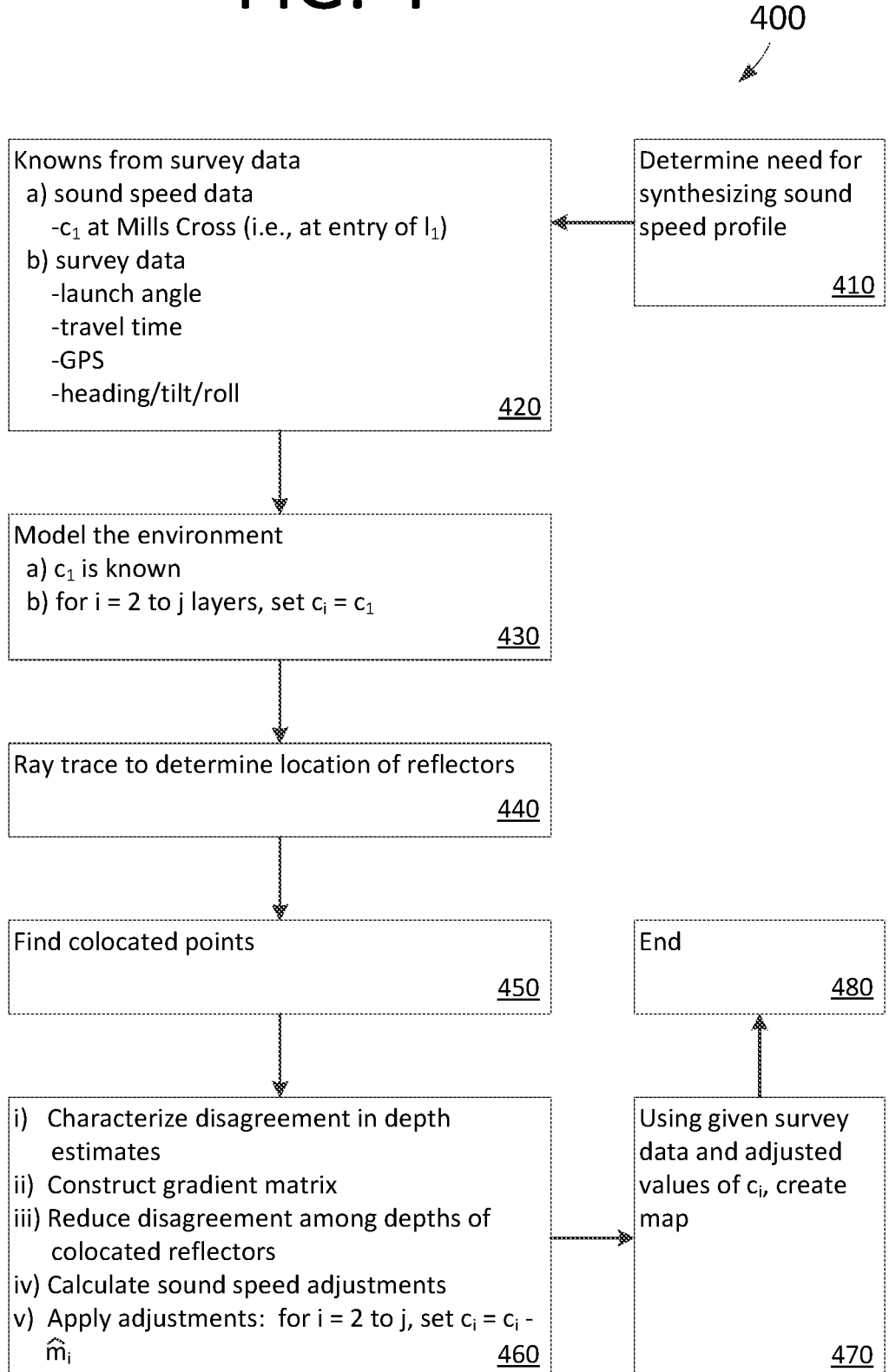
FIG. 4 shows a method using the MBES of FIG. 1A for synthesizing a sound speed profile using the MBES of FIG. 1A.

FIG. 4 shows a method for synthesizing a sound speed profile where a waterbody is modeled with multiple layers 400. Steps in this synthesis method corresponding to those mentioned above (see e.g., FIGS. 3A-G) may be carried out in a similar manner.

In a first step 410 the need for synthesizing a sound speed profile is evaluated. Where there is a need, the process proceeds to a second step 420.

In the second step 420, known variables are identified. In particular, knowns may be sound speed at a Mills Cross transducer array, launch angle, travel time, GPS data, and vessel heading/tilt/roll data. In a third step 430, the environment is modeled. Here, $c_1$ is known and for j layers the sound speed is set to $c_1$ such that in each layer the speed of sound is the same.

With a multilayer model, ray tracing locates reflectors in a fourth step 440. And, finding groups of colocated reflectors follows in a fifth step 450.

In step 460, i) disagreements in depth estimates are characterized in a manner similar to that described in step 360 above, a gradient matrix is constructed in a manner similar to that described in step 370 above, disagreements among depth estimates in each group of colocated reflectors are reduced in a manner similar to that described in step 380 above, iv) sound speed adjustments are calculated in a manner similar to that described in step 380 above, and v) sound speed adjustments are applied as suggested above. Using the adjusted values of sound speed, a survey may be created in step 470. Following step 470 is an end step 480.

In an embodiment, a threshold value that when compared to a function of the measured depth disagreements indicates whether the assumed sound speed profile differs from the real environment.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of obtaining multi-perspective sonar data comprising the steps of:
    installing a multibeam echo sounder system ("MBES") on a water going vehicle for use on a waterbody such that plural transducers in a single MBES projector array and plural transducers in a single MBES hydrophone array are in a Mills Cross arrangement;
    traversing a vehicle route while operating the MBES where multiple receive beams intersect a transmit beam such that along the vehicle route i) plural primary areas are ensonified, ii) plural secondary areas are ensonified, iii) each primary area is overlapped by a respective secondary area, and iv) for each overlap a first acoustic transmission from a first MBES location follows a first path to a first reflector and a reciprocal echo path back to the first MBES location to obtain a first travel time from a first perspective, and a second acoustic transmission from a second MBES location different from the first follows a second path to a second reflector and a reciprocal echo path back to the second MBES location to obtain a second travel time from a second perspective; and,
    with aid of the first and second travel times, determining if the first and second reflectors are colocated;
    where the reflectors are colocated and with aid of the first and second travel times, determining a depth of the first reflector and a depth of the second reflector; and,
    finding a sound speed that tends to minimize a mathematical function dependent upon at least the depth of the first reflector and the depth of the second reflector.

2. The method of claim 1 wherein the reflectors are located on a waterbody bottom divided into areas, the reflectors determined to be colocated if they are found in the same area.

3. The method of claim 1 wherein:
    for travel times obtained from the multiple overlaps, modeling propagation of sound through the waterbody to locate in three dimensions reflectors that returned the echoes; and,
    one of the dimensions indicating a waterbody depth and the other two dimensions indicating coordinates in a reflector plane facing a free surface of the waterbody.

4. The method of claim 3 further comprising the steps of:
    given an estimate of sound speed as a function of depth, testing a consistency of this estimate with data from the multi-perspective sonar.

5. The method of claim 3 further comprising the step of:
    given an estimate of sound speed as a function of depth, testing a consistency of this estimate with travel times corresponding to the echoes.

6. The method of claim 3 further comprising the step of:
    given an estimate of sound speed as a function of depth, improving the estimate using the multi-perspective sonar data.

7. The method of claim 3 further comprising the step of:
    given an estimate of sound speed as a function of depth, improving the estimate using travel times corresponding to the echoes.

8. The method of claim 3 further comprising the step of:
    absent an estimate of sound speed as a function of depth, deriving an estimate of sound speed as a function of depth using the multi-perspective sonar data.

9. The method of claim 3 further comprising the step of:
    absent an estimate of sound speed as a function of depth, deriving an estimate of sound speed as a function of depth using travel times corresponding to the echoes.

10. The method of claim 3 further comprising the steps of:
    identifying reflectors colocated in a reflector plane; and, choosing adjusted sound speed values to reduce disagreements in colocated reflector depths.

11. The method of claim 10 wherein the disagreements in depth are used to construct a system of simultaneous equations that is overdetermined, plural adjustments to respective sound speed values being indicated by a solution to the simultaneous equations.

12. The method of claim 11 wherein pre-existing estimates of sound speed as a function of depth are perturbed one at a time, in both a positive and a negative direction, effects of the pertubations on travel times used in the derivation of plural adjustments to respective sound speed values.

13. The method of claim 1 wherein a vehicle's non-intersecting first and second vehicle routes are chosen such that operating the MBES while traversing the routes results in (i) at least partially superimposed first and second waterbody bottom fans that overlap at a site and (ii) multiple echoes from multiple colocated reflectors at the site.

14. The method of claim 1 wherein a vehicle's intersecting first and second vehicle routes are chosen such that operating the MBES while traversing the routes results in (i) at least partially superimposed first and second waterbody bottom fans that overlap at a site and (ii) multiple echoes from multiple colocated reflectors at the site.

15. The method of claim 1 wherein MBES operation while traversing a single vehicle route results in (i) at least partially superimposed first and second waterbody fans that overlap at a site and (ii) multiple echoes from multiple colocated reflectors at the site.

16. The method of claim 15 wherein the first waterbody fan results from a forwardly pitched fan at time1 and the second waterbody fan results from a rearwardly pitched fan at time2 where time2>time1.

17. The method of claim 3 further comprising the step of operating the vehicle and the MBES to conduct a bathymetric survey.

18. The method of claim 17 further comprising the step of:
    assigning each reflector to one of multiple zones that partition the reflector plane; and,
    wherein reflectors assigned to the same zone are colocated reflectors.

19. The method of claim 18 wherein each of plural zones includes a respective group of 2 to 100 colocated reflectors.

20. The method of claim 19 wherein the zones have a characteristic dimension that is a function of a beam width and an altitude measured vertically between the MBES and a waterbody bottom.

21. The method of claim 19 wherein the zones have a characteristic dimension that varies proportionally with water depth.

22. The method of claim 1 further comprising the steps of:
- identifying colocated reflectors; and,
- choosing sound speed values to reduce disagreements in colocated reflector depths;
- wherein a portion of a pre-existing bathymetric survey map is corrected when data used to make the map are used to find adjusted sound speed values and the survey map is recreated by replacing the chosen sound speed values with the adjusted sound speed values.

\* \* \* \* \*